Figure 1:
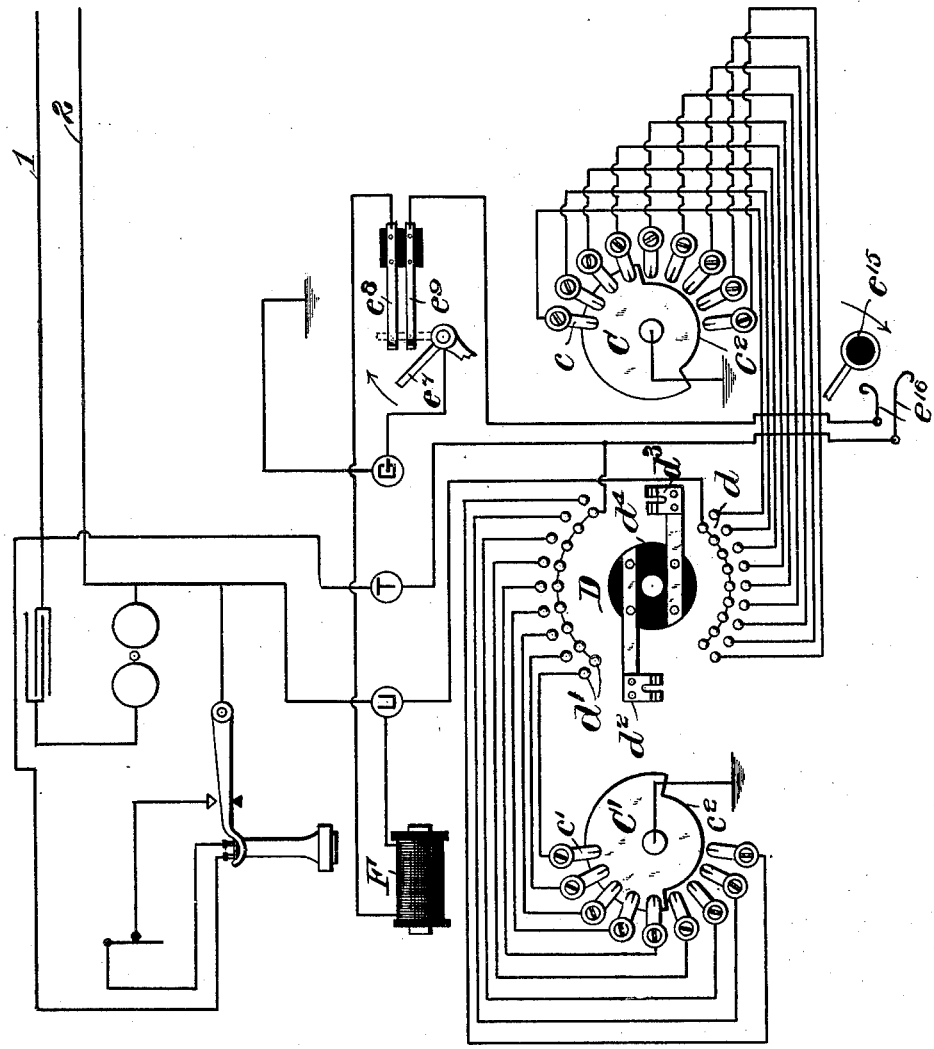

No. 686,892. Patented Nov. 19, 1901.
E. A. FALLER.
AUTOMATIC TELEPHONE SYSTEM.
(Application filed Aug. 22, 1901.)

(No Model.) 15 Sheets—Sheet 1.

Witnesses
John H. Holt.
Geo. S. Payne.

Inventor
E. A. Faller
by Wilkinson & Fisher
Attorneys

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 2.
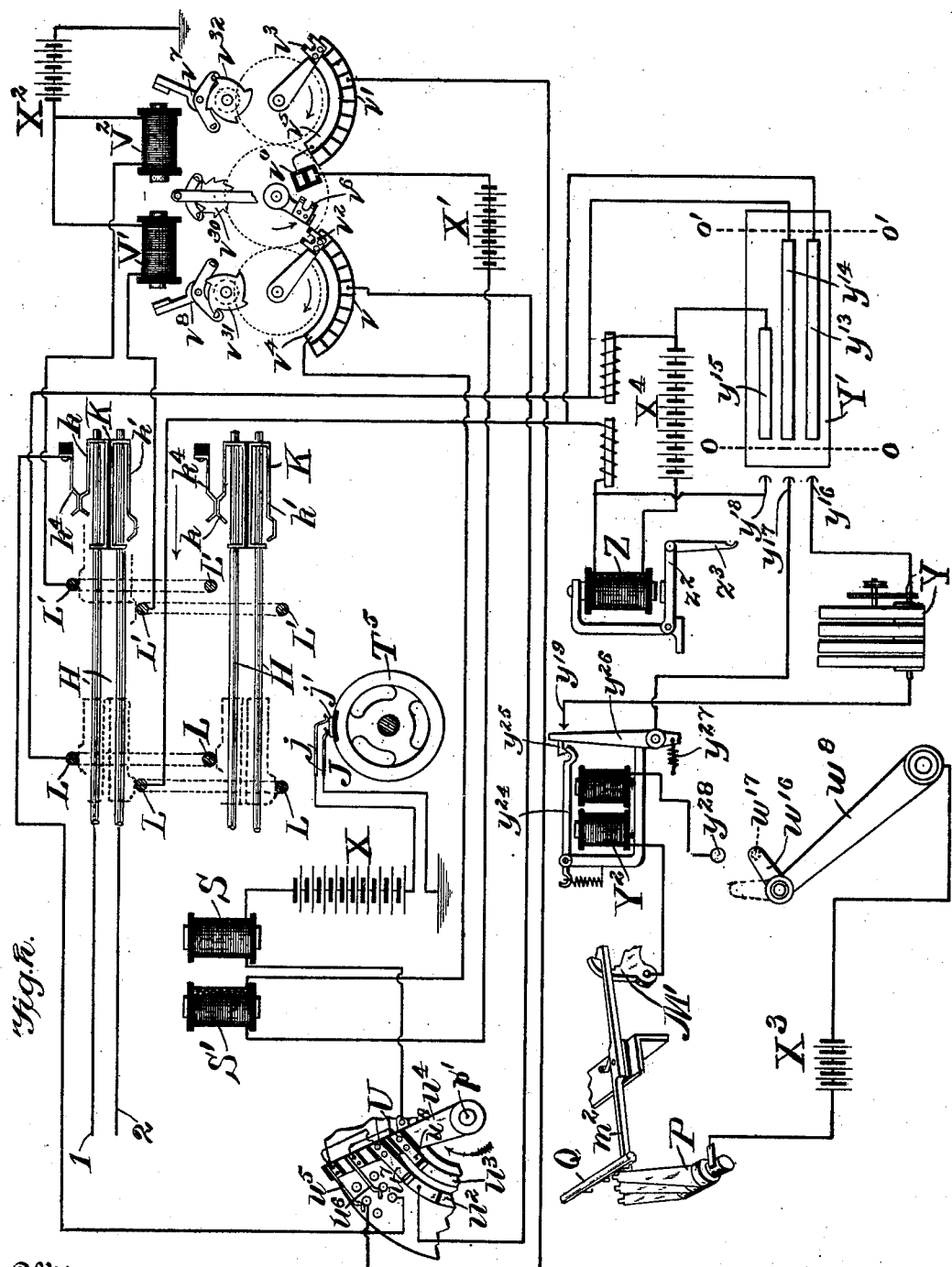
Witnesses
Inventor
E. A. Faller
by Wilkinson & Fisher
Attorneys No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 3.
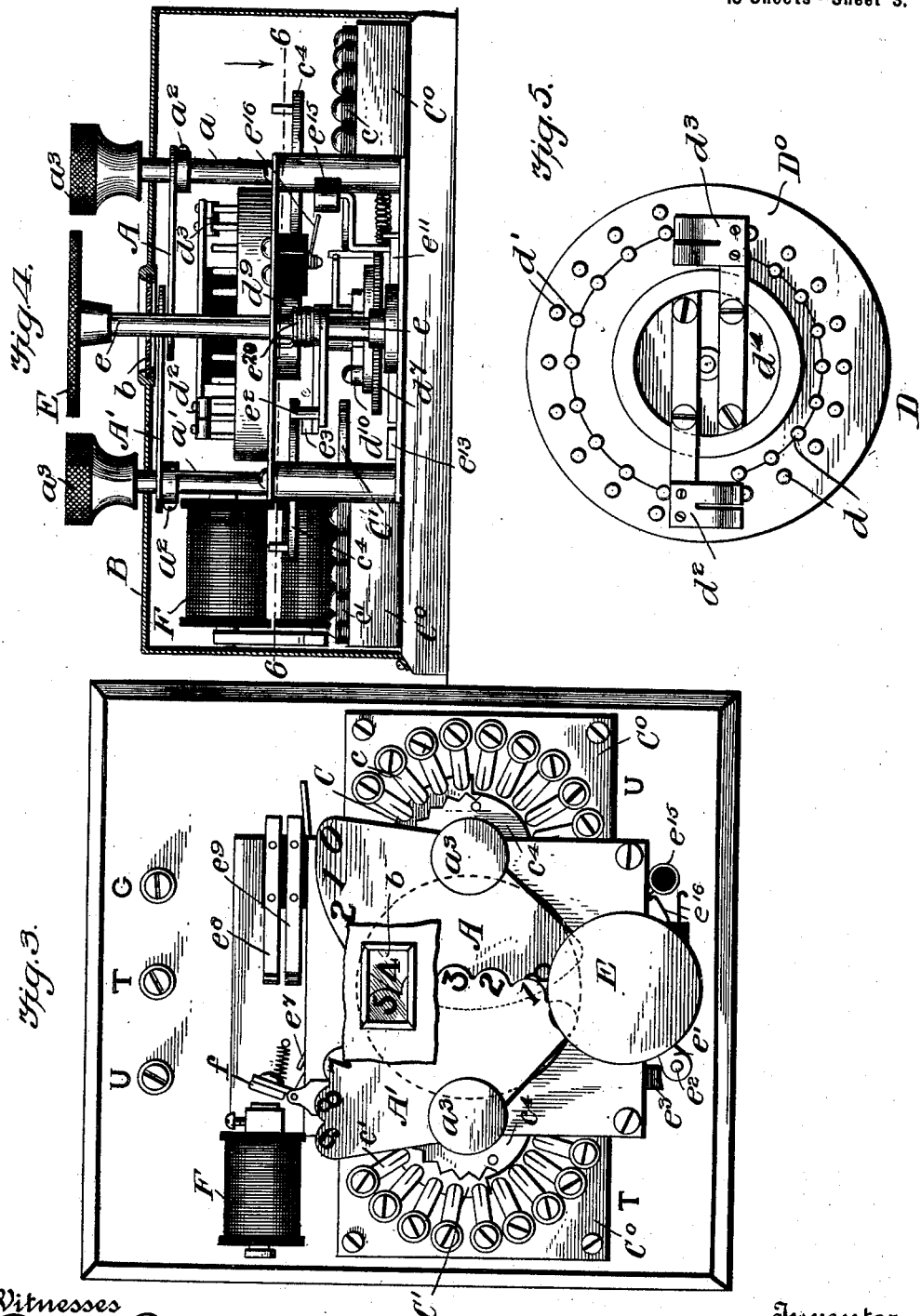
Witnesses
Inventor
E. A. Faller
by Wilkinson & Fisher
Attorneys No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 4.
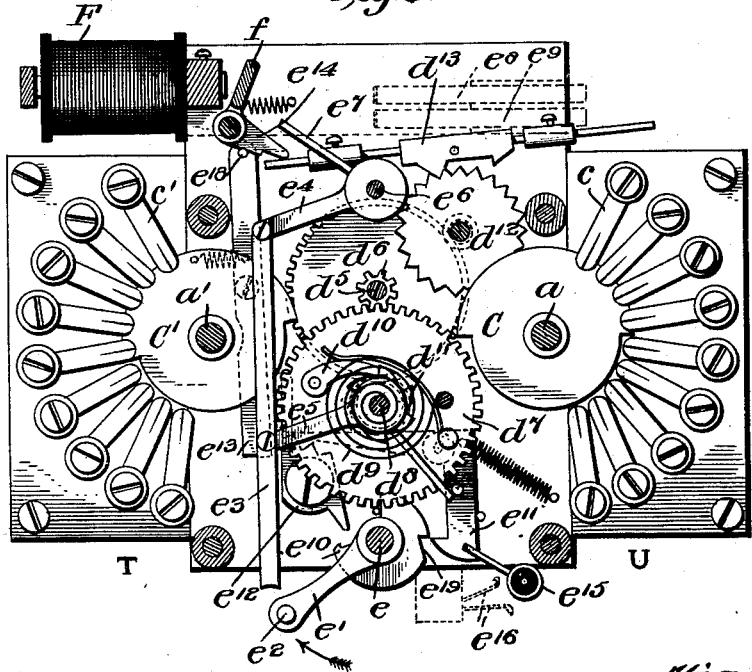
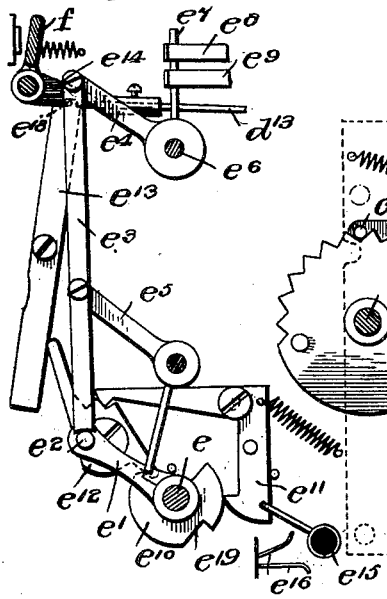
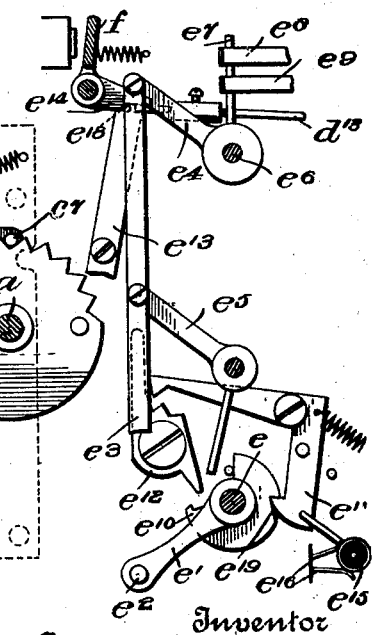

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 5.
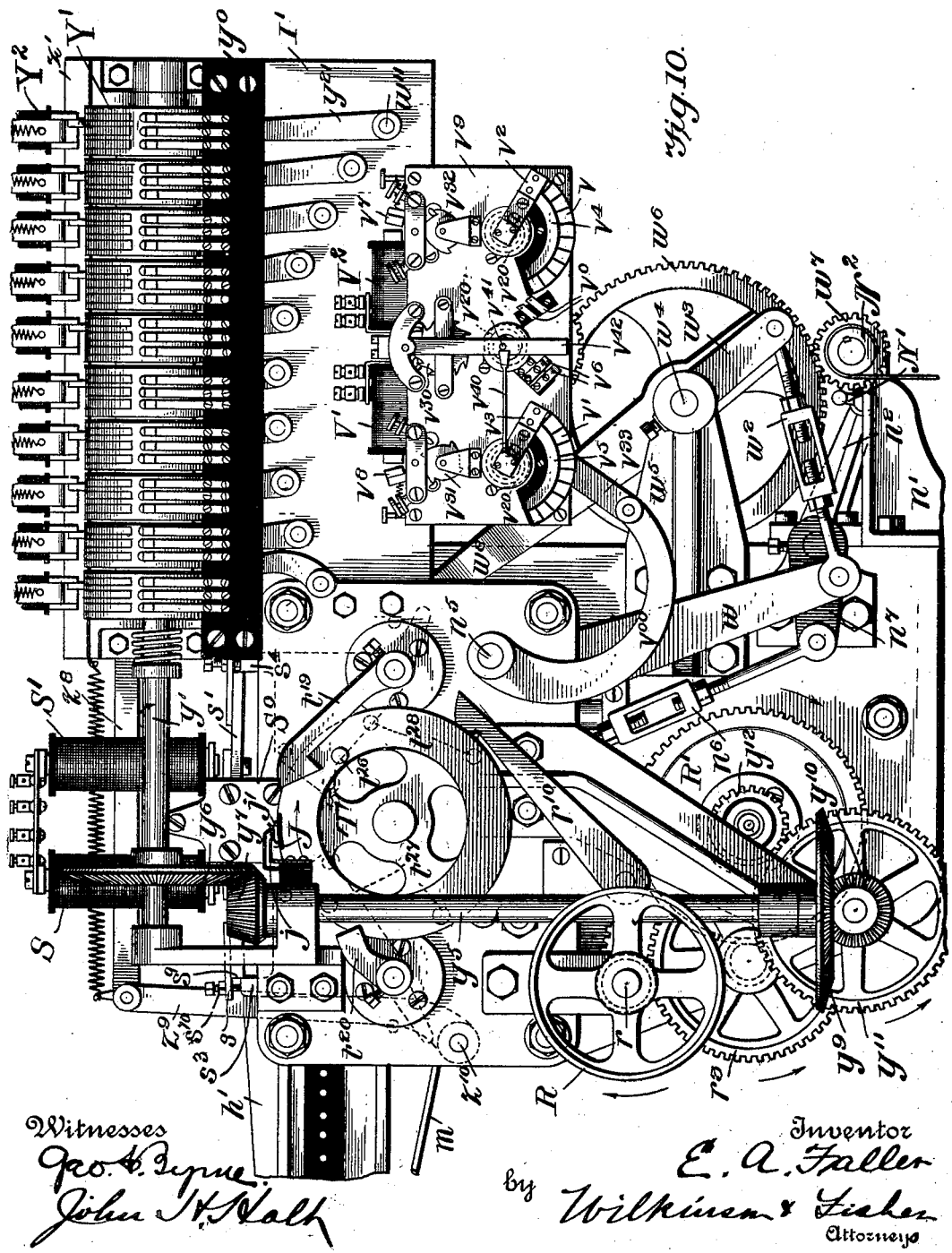
Witnesses
Inventor
E. A. Faller
by Wilkinson & Fisher
Attorneys

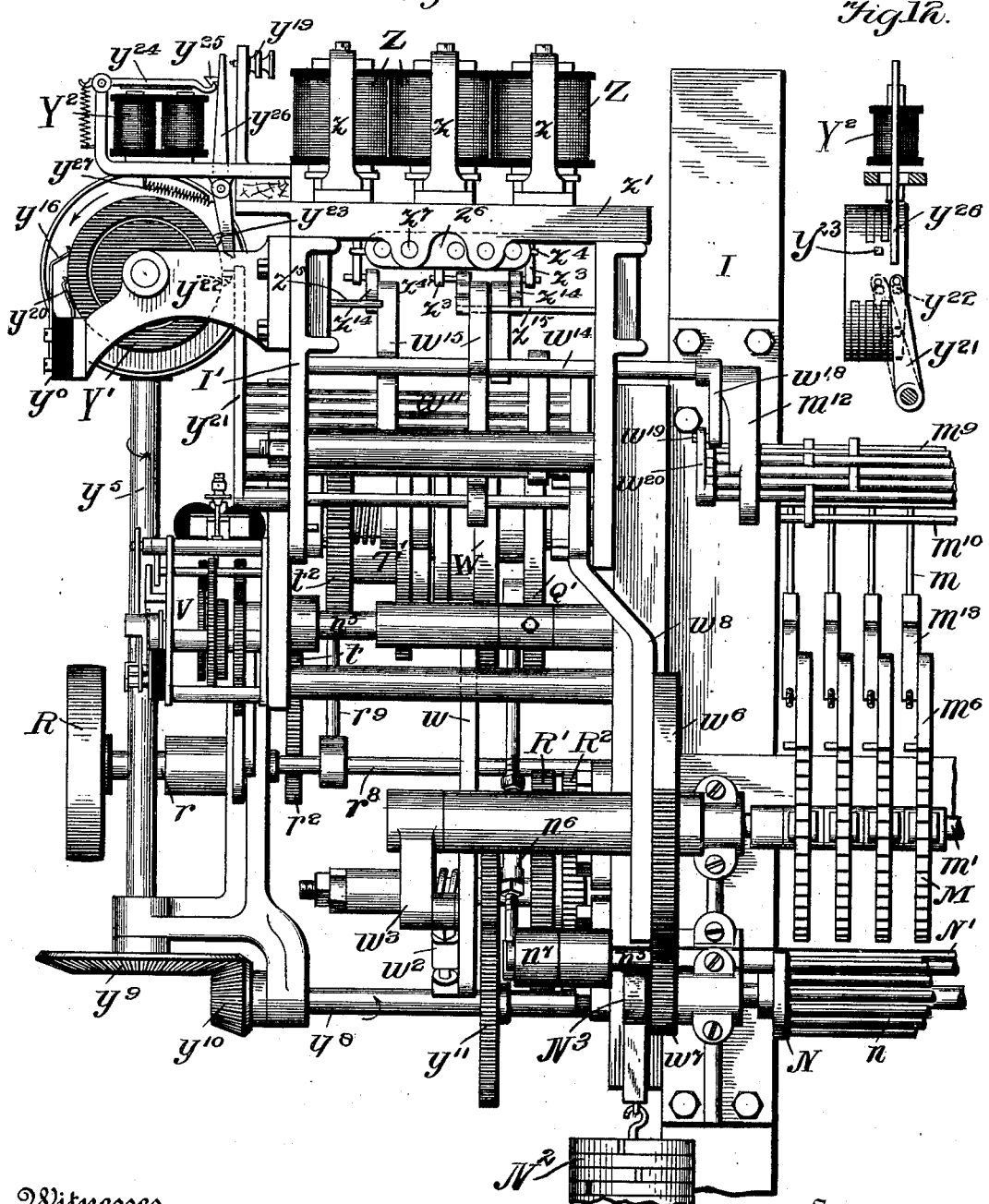

No. 686,892. Patented Nov. 19, 1901.
E. A. FALLER.
AUTOMATIC TELEPHONE SYSTEM.
(Application filed Aug. 22, 1901.)

(No Model.) 15 Sheets—Sheet 7.

No. 686,892.  
E. A. FALLER.  
AUTOMATIC TELEPHONE SYSTEM.  
(Application filed Aug. 22, 1901.)
Patented Nov. 19, 1901.
(No Model.)
15 Sheets—Sheet 8.
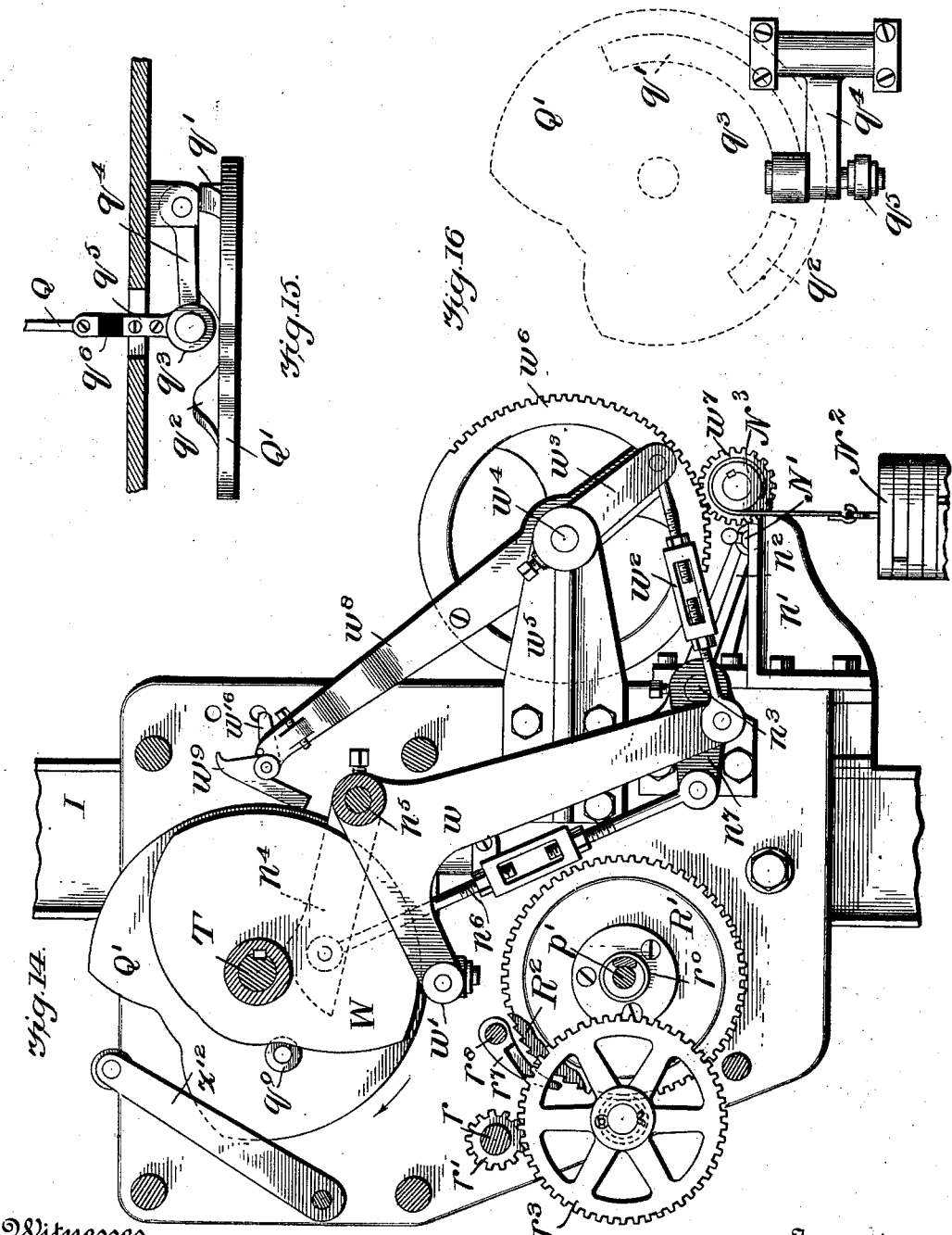

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 9.
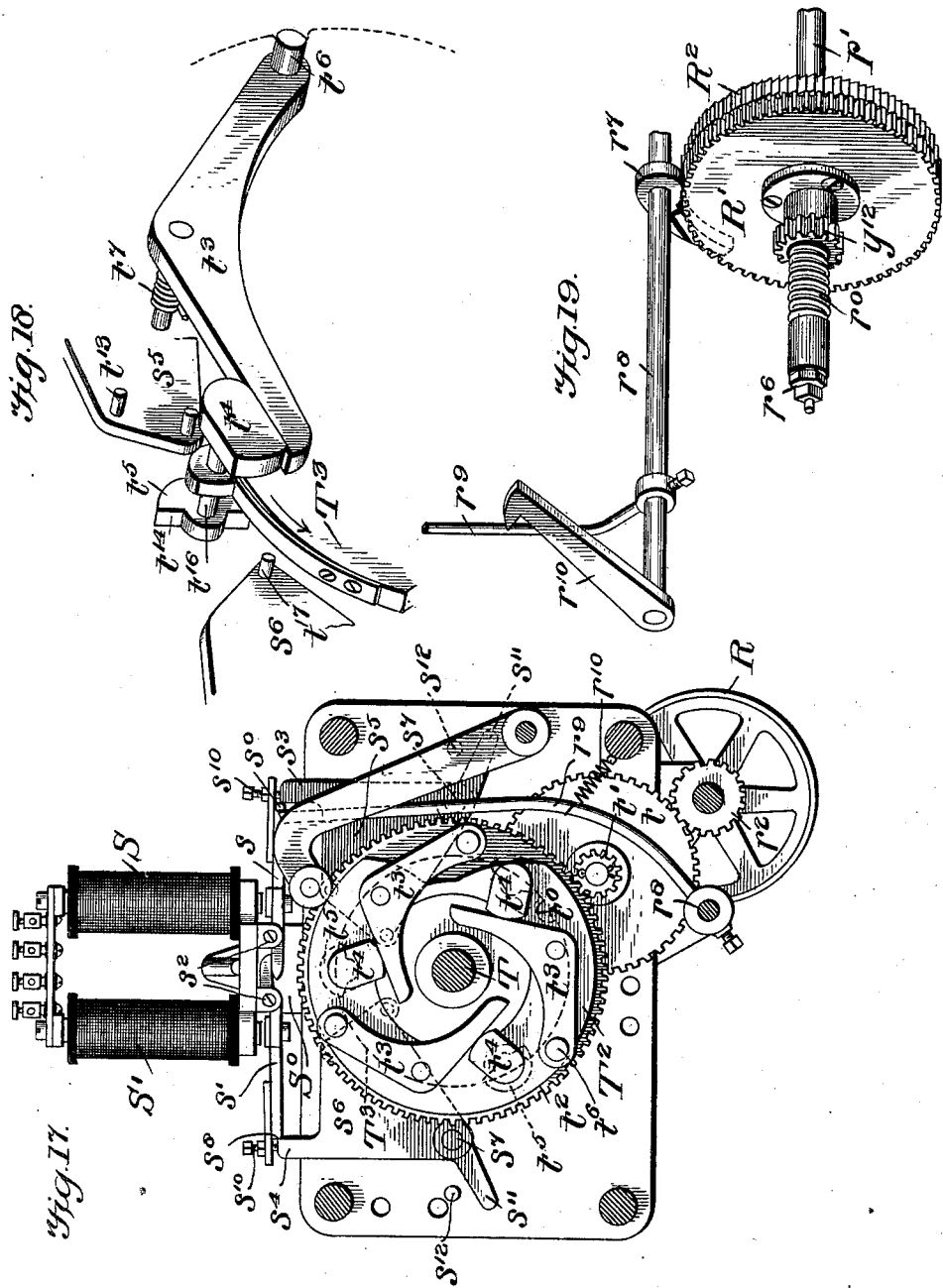

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 10.
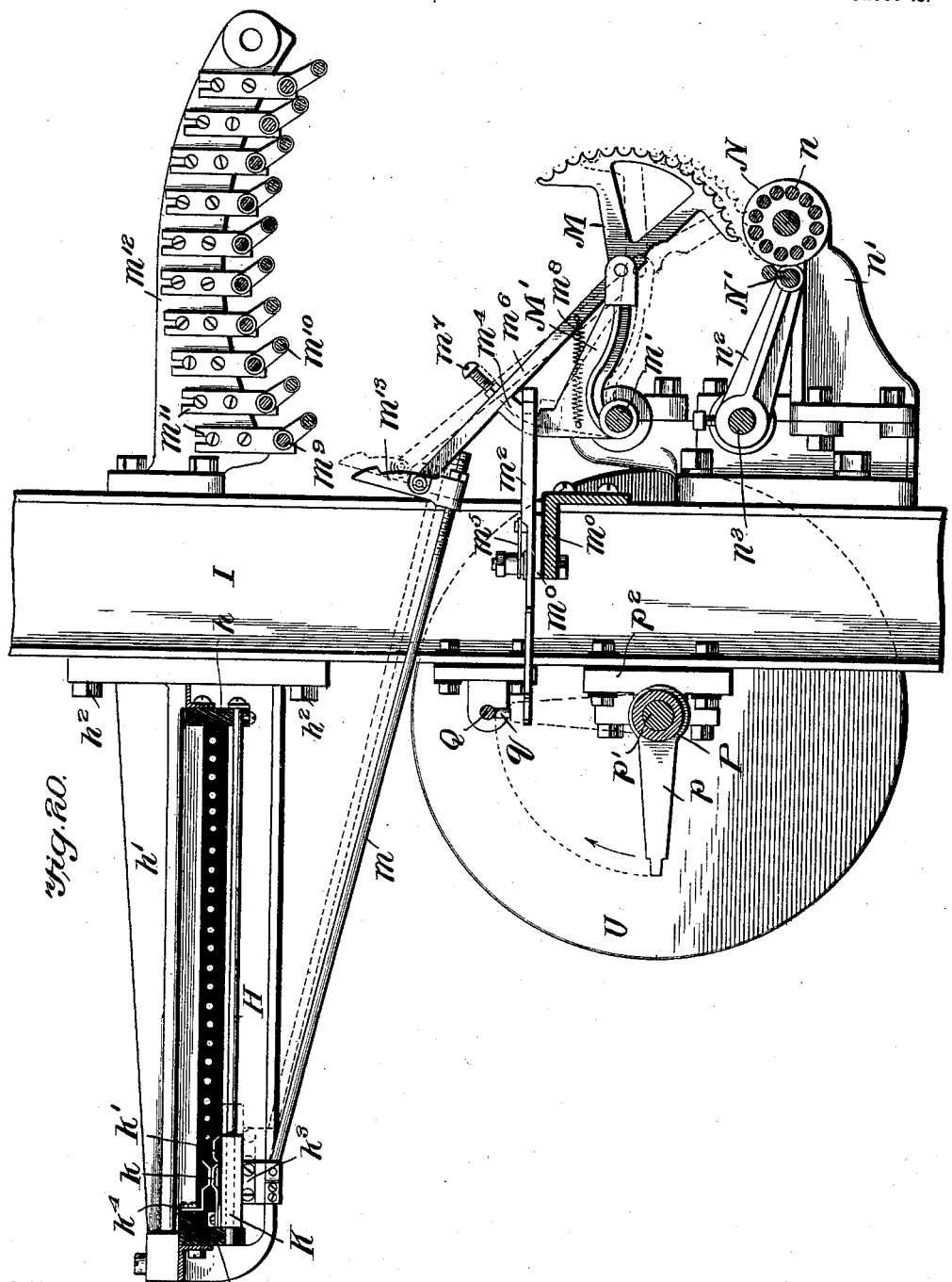
Witnesses
Inventor
E. A. Faller
by Wilkinson & Fisher
Attorneys

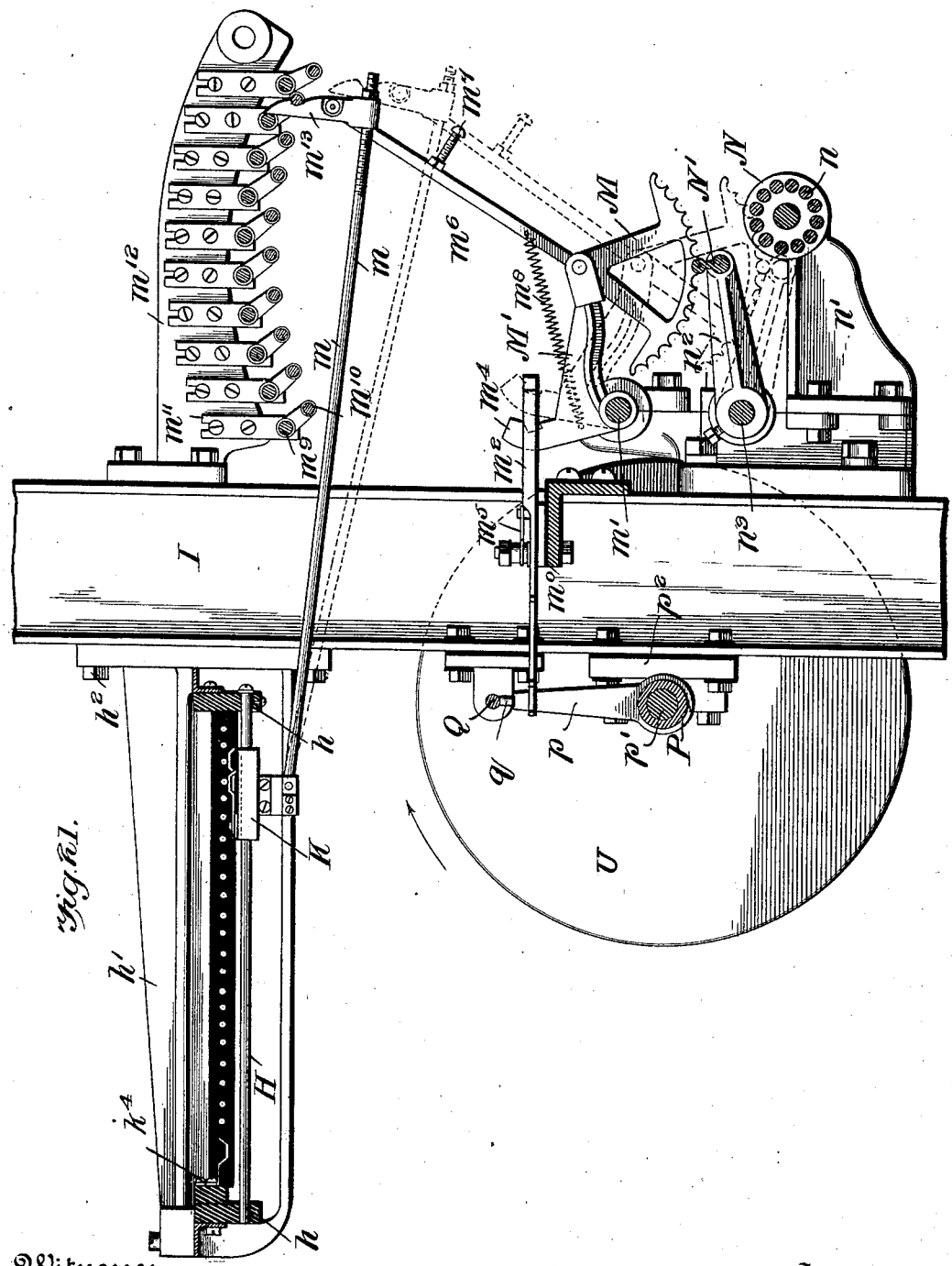

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 12.
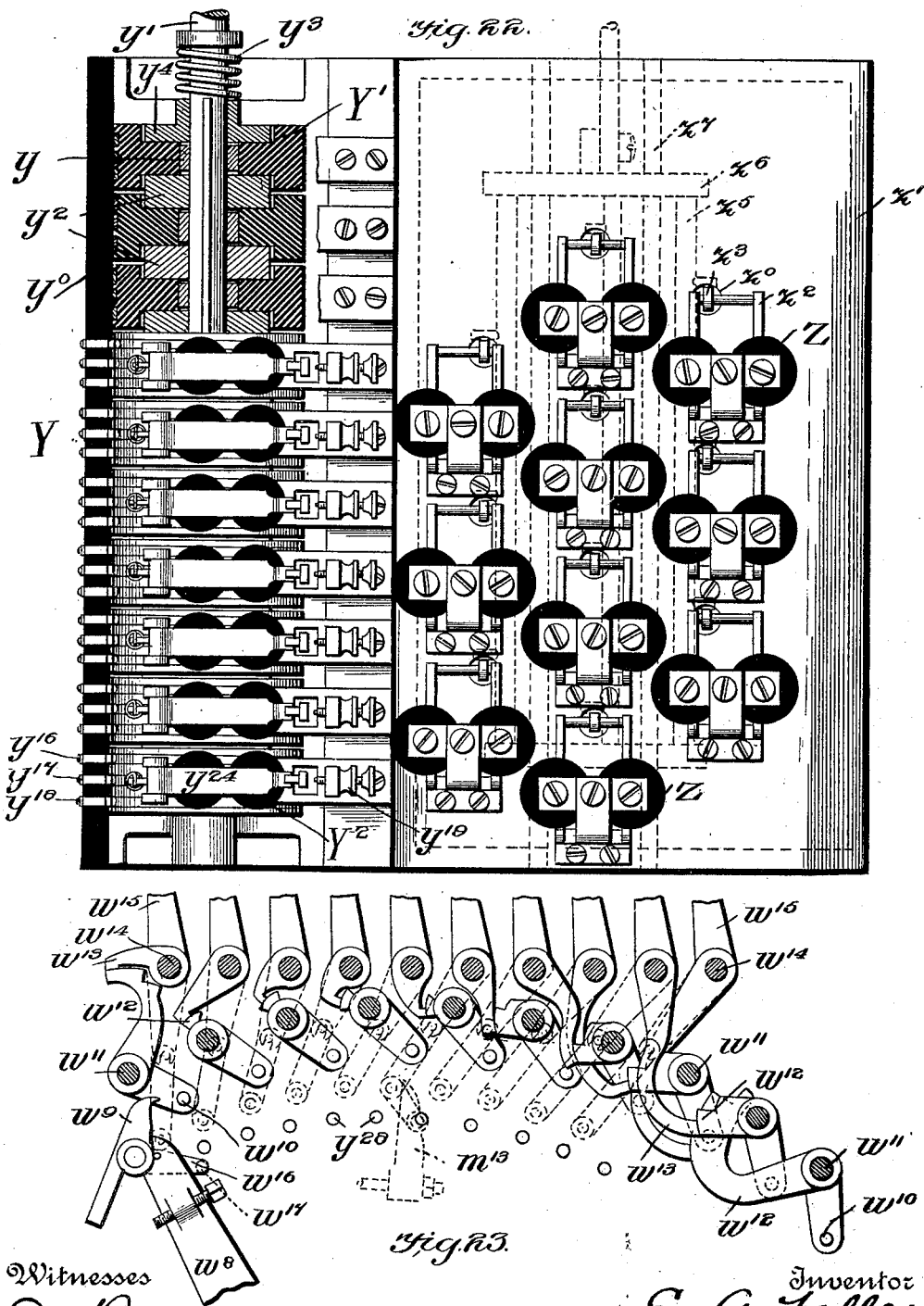

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 13.
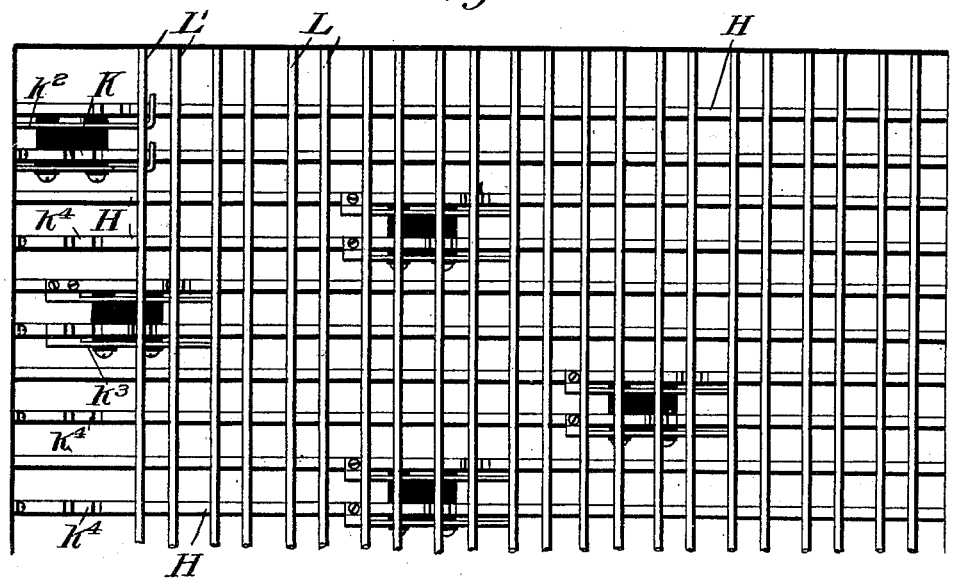
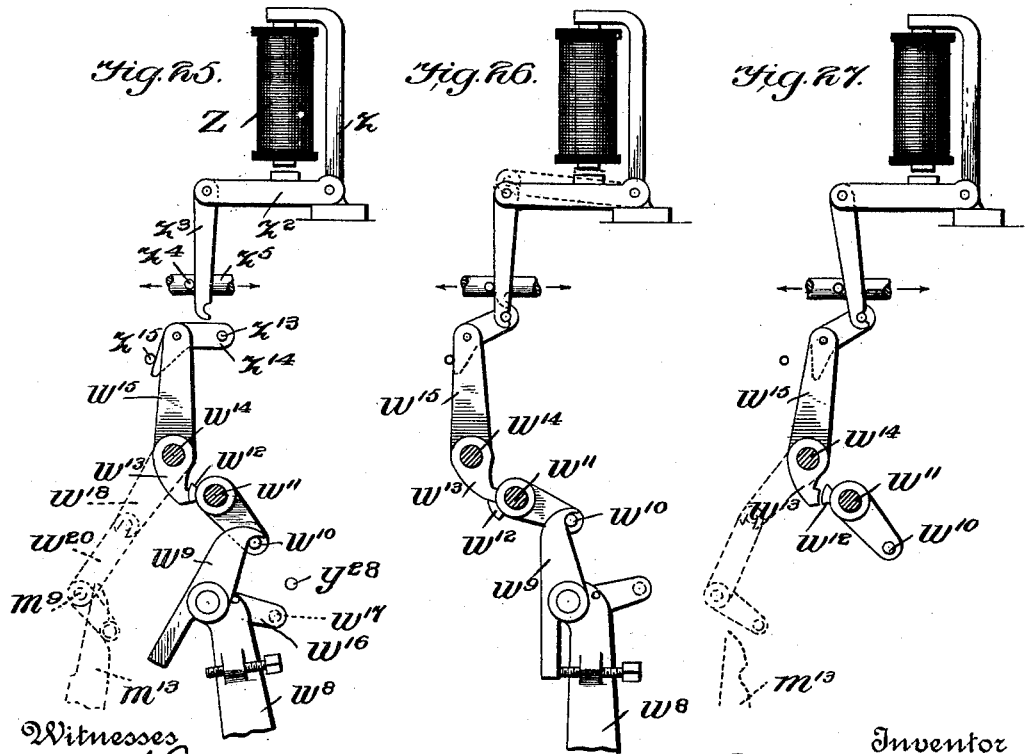

No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 14.
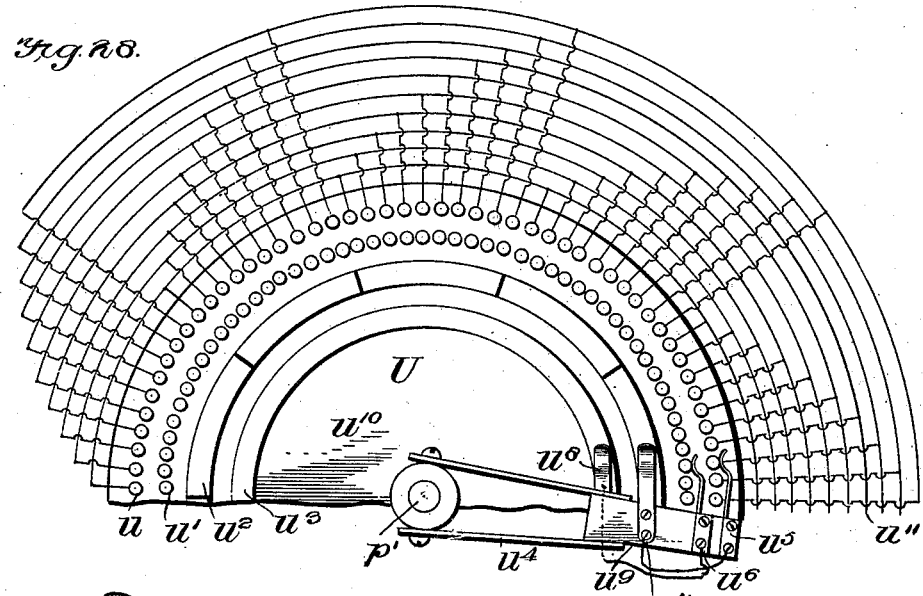
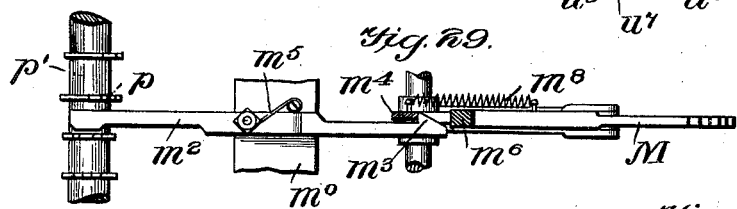
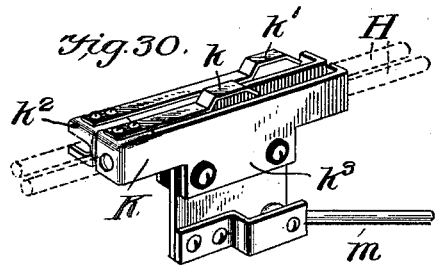
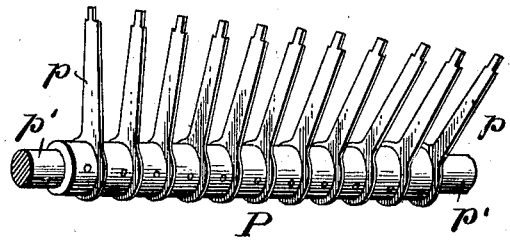
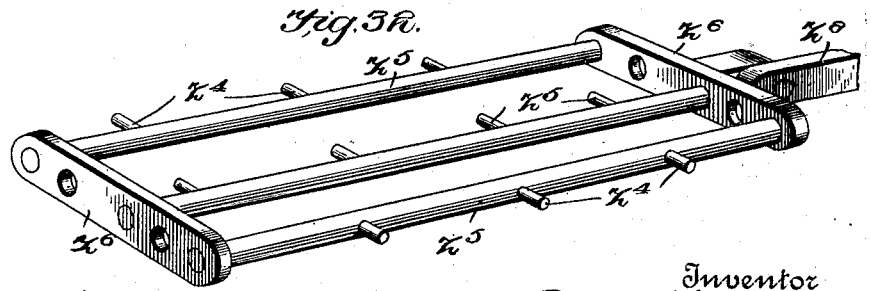
Witnesses
Inventor
E. A. Faller
by Wilkinson & Fisher
Attorneys No. 686,892. Patented Nov. 19, 1901.
E. A. FALLER.
AUTOMATIC TELEPHONE SYSTEM.
(Application filed Aug. 22, 1901.)
(No Model.) 15 Sheets—Sheet 15.

UNITED STATES PATENT OFFICE.

ERNEST A. FALLER, OF BALTIMORE, MARYLAND, ASSIGNOR OF ONE-HALF TO JAMES W. CHISHOLM, OF BALTIMORE, MARYLAND.

AUTOMATIC TELEPHONE SYSTEM.

SPECIFICATION forming part of Letters Patent No. 686,892, dated November 19, 1901.

Application filed August 22, 1901. Serial No. 72,942. (No model.)

*To all whom it may concern:*

Be it known that I, ERNEST A. FALLER, a citizen of the German Empire, residing at Baltimore, in the State of Maryland, have invented certain new and useful Improvements in Automatic Telephone Systems, (Case A;) and I do hereby declare the following to be a full, clear, and exact description of the invention, such as will enable others skilled in the art to which it appertains to make and use the same.

My present invention relates to improvements in automatic telephone-exchange systems, and has for its primary object the performance by machinery with the aid of electricity of all the operations now performed by an operator of the best manual exchanges and in doing this to dispense with the use of electricity as a motive power to the greatest extent possible and to substitute power-controlled movements therefor, thereby doing away with the multiplicity of contacts, magnets, and also the greater part of the wires now used in an exchange.

In causing the automatic exchange herein described to do the actual work performed by an operator of a manual exchange the conversion of a manual into an automatic exchange may be accomplished with the minimum amount of alteration, as the terminal connections are very much the same in both cases. The subscriber's telephone is not disturbed nor the business of the exchange materially interfered with, this system being a straight central energy system throughout, though it could be easily adapted to the now almost obsolete "individual-battery" system.

The numerous automatic telephone systems evolved so far while differing in mechanical and electrical details all employ in some form the idea of the so-called "Swiss" switchboard, which means that two distinct sets of connecting devices are employed, preferably disposed at right angles to each other, and a third connecting means completes the connection; or, to state it differently, the connection of the calling subscriber differs from that of the called subscriber. For example, in a well-known system the called connection is one of a bank of contacts, circularly disposed in the path of a rotatable sweeper or traveling contact which forms the calling connection. In another representative system carriages carrying the calling contact are movably disposed in proximity to wires forming the called contacts, the direction of the travel of the carriages being at right angles to the wires. This, however, is not the case with the present invention. The central terminal connection of a subscriber according to my invention is identically the same whether he be the calling or called subscriber. This I effect by having all subscribers' lines terminate at central in similar terminal switches and connecting the switches of both calling and called subscribers to cord-circuit terminals, just as in manual practice the calling and called jacks are connected by a cord and plug, and it is this mode of connecting the subscribers which alone makes it possible to dispense altogether with taps, cross-wires, or multiple connections in my exchange.

This invention, moreover, constitutes a departure from other automatic exchanges and also manual exchanges in dispensing with an individual magnet for each subscriber's line and substituting therefor a busy-wheel and other mechanical apparatus hereinafter described. The point gained by the use of this busy-wheel is not, however, mainly the saving of magnets, but the establishing of a rotation of subscribers, which makes any additional apparatus to safeguard against the possibility of several subscribers' simultaneous calls interfering with each other entirely unnecessary.

My invention furthermore consists in placing all the operations of the exchange switching apparatus under the initial control of a single magnet which is placed at the disposal of no two subscribers simultaneously, but to all at successive intervals.

My invention also consists in providing means by which a complete isolation of the subscribers' circuits is obtained by placing the connecting devices of these circuits wholly beyond the reach of the central power mechanism.

My said invention also comprises a novel form of clearing-out device, busy test, and subscriber's sender, and other features hereinafter more particularly described, and pointed out in the claims.

In order to more fully describe my said invention, reference is had to the accompanying drawings, in which—

Figure 13:
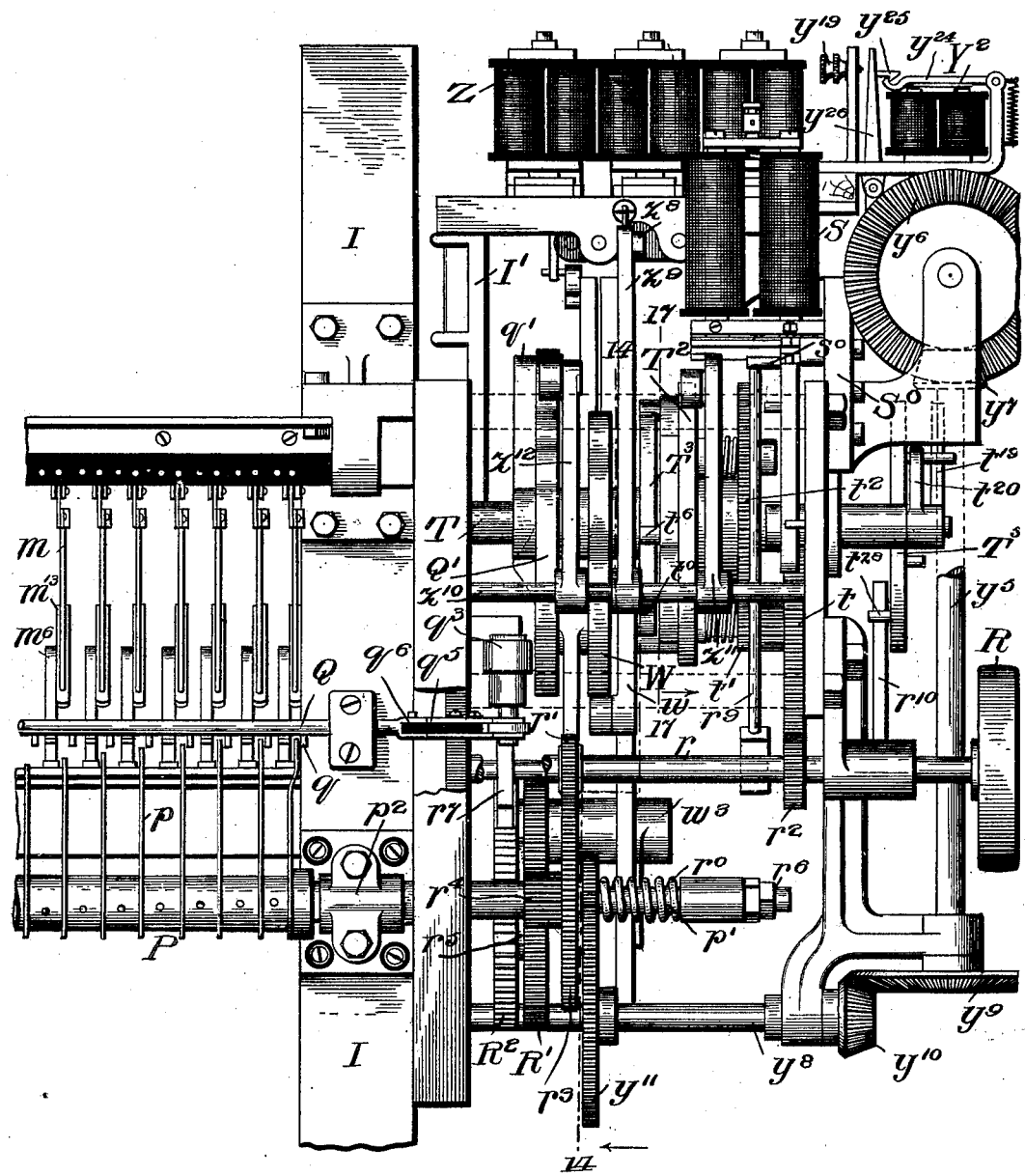
Figure 33:
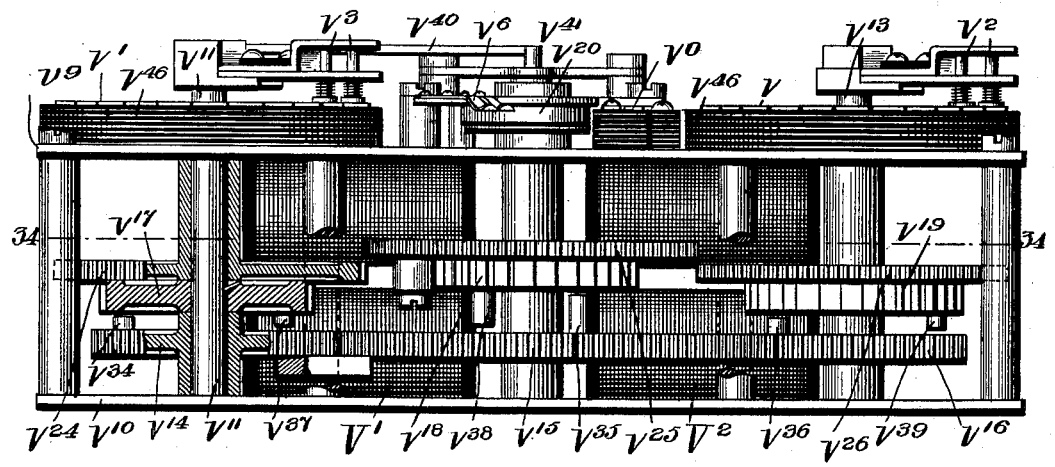
Figure 34:
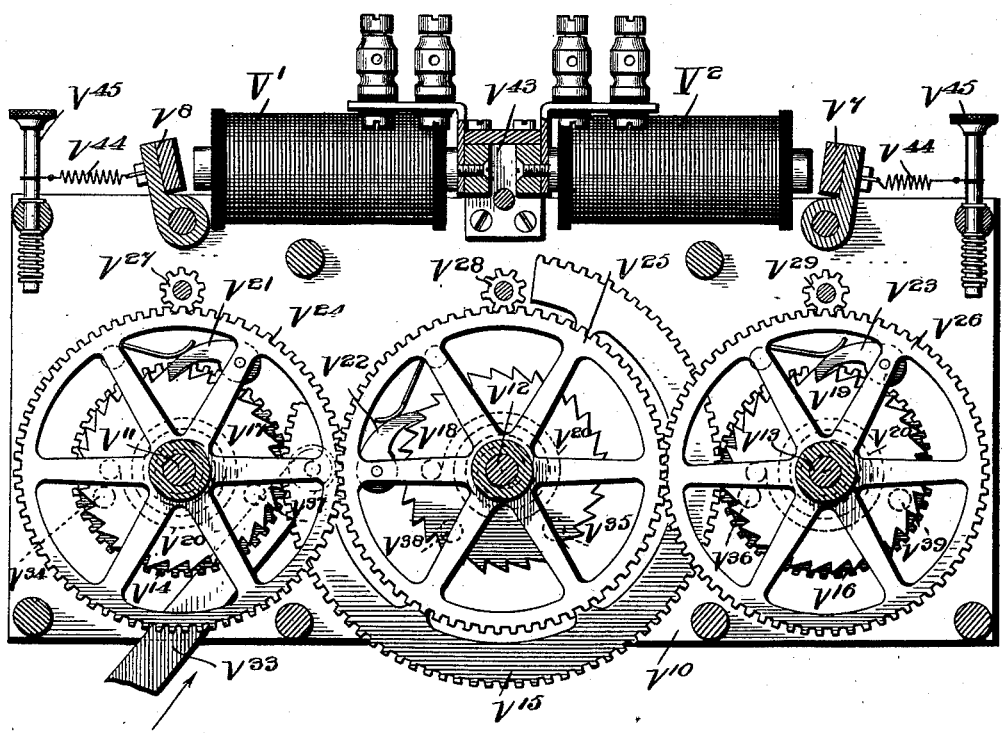

Figure 1 is a diagram of the circuits of a subscriber's outfit, and Fig. 2 a diagram of the central-exchange circuits. Fig. 3 represents the sender in top plan view with the casing removed. Fig. 4 is an end elevation of the sender with the casing in section. Fig. 5 is a detail top plan view of the rotating contact-maker of the sender, and Fig. 6 a section taken along the line 6 6 of Fig. 4 and looking down. Fig. 7 is a detail view of a part of the sender-locking mechanism, showing the relative position of the parts during operation; and Fig. 8 is a similar view showing the sender-locking mechanism in the position it assumes when the sender is set for a signal and locked. Fig. 9 is a detail sectional view of the sender-dial-locking mechanism, the top plate of the sender being shown in dotted lines. Fig. 10 is an end elevation of the central switchboard and power device with parts broken away. Fig. 11 is a front elevation of the same. Fig. 12 is a detail view of a portion of the ringer-actuating mechanism. Fig. 13 is a rear elevation of the parts shown in Fig. 11, and Fig. 14 a section taken along the line 14 14 of Fig. 13 and looking in the direction of the arrows. Fig. 15 is a detail view of the shuttle-dropping cam and lever operated thereby; and Fig. 16, a top plan view of the same, showing the cam in dotted lines. Fig. 17 is a section along the line 17 17 of Fig. 13 and looking in the direction of the arrow. Fig. 18 is a detail perspective view of a portion of the floating clutch mechanism. Fig. 19 is a detail perspective view of the busy-wheel stop mechanism. Fig. 20 is a cross-section, partly in elevation, of the switchboard; and Fig. 21 is a similar view of the same, showing a shuttle thrown into the locked position. Fig. 22 is a top plan view of the clearing-out device and ringer-operating mechanism. Fig. 23 is a detail view of a portion of the shuttle locking and releasing mechanism. Fig. 24 is a top plan view of a section of the switchboard, showing the cord-circuit terminals, carriage-rods, and carriages in different operative positions. Figs. 25, 26, and 27 are detail views of the clearing-out mechanism, showing the same in different stages of operation. Fig. 28 is a detail view of the central-exchange rotating contact-maker, showing the arrangement of its connections. Fig. 29 is a detail top plan view of one of the shuttles and shuttle-locks. Fig. 30 is a detail perspective view of one of the carriages carrying the terminal-springs of a subscriber's line. Fig. 31 is a detail perspective view of a portion of the busy-wheel, and Fig. 32 a detail perspective view of the reciprocating carriage for operating the clearing-out mechanism. Fig. 33 is a side elevation of the selector; and Fig. 34 is a section of the same, taken along the line 34 34 of Fig. 33.

Similar letters and numerals refer to similar parts throughout the several views.

In carrying out my invention I use an ordinary telephone-circuit employing any well-known subscriber's outfit and the usual protecting devices, and to each of these subscriber's outfits I add a small instrument, which will be designated a "sender," the office of which is to send electrical impulses over the subscribers' lines and the ground, and thus to cause the central exchange to perform the switching necessary to connect the calling with the called subscriber. This sender is connected in the line and ground in multiple with the subscribers' instruments and may be located at any point accessible to the subscriber.

A form of the sender is shown in Figs. 1 and 3 to 9, inclusive, in which A and A' represent, respectively, two number-dials, upon each of which is arranged a series of numbers "0" to "9," the numbers upon the dial A composing the units and those upon the dial A' the tens of the number desired by the calling subscriber. These dials are mounted fast upon the rotatable spindles $a$ and $a'$, respectively, and made adjustable thereon by means of the set-screws $a^2$. These spindles $a$ and $a'$ terminate each in a milled head $a^3$, forming knobs by which the operator may adjust the dials until the proper combination comprising the number of the called subscriber is obtained. These numbers are displayed to the operator through a preferably glass-covered opening $b$ in the casing B, which incloses the mechanism of the sender.

C and C' represent metal contact-disks mounted fast upon the spindles $a$ and $a'$, respectively, and therefore adapted to rotate as the dials A and A' are rotated. These contact-disks are located in proximity to a series of circularly-disposed resilient contact-makers $c$ and $c'$ and are reduced in diameter, as at $c^2$, sufficiently to allow some of the contacts $c$ $c'$ to engage them, while others clear them or all to engage them or all clear them, as the case may be. These contact-makers are mounted upon plates of insulation $C^0$. Both disks C C' are permanently grounded by being electrically connected through the frame of the instrument with the ground-terminal, (indicated at G.) Each of the contacts $c$ is connected to one of the outer row of a series of circularly-disposed contact-pins $d$, and the contacts $c'$ are similarly connected to the outer row of a series of contact-pins $d'$. These pins $d$ and $d'$ constitute the contact-points of a rotating contact-maker D. In each series of these contact-pins there is an inner row of pins concentric with the outer row, each inner pin in a radial line with respect to its corresponding outer pin. The pins comprising the inner row of each set are electrically connected together, and those of the set $d$ are connected to the tens-terminal of the sender, (indicated at T,) and those of the series $d'$ connected to the units-terminal U, all of which is most clearly shown in Fig. 1. The series of contact-pins $d'$ is arranged in the path of a rotating brush $d^2$ and the series $d$ in the path of a brush $d^3$, so that as these brushes rotate the brush $d^2$ will short-circuit the inner and outer row of pins of the series $d'$ and the brush $d^3$ will perform the same function relative to the pins $d$. These pins are so arranged, however, that as brush $d^2$ passes over the series $d$ it will rest upon the outer row of pins only, and therefore will not short-circuit them, and the same holds true with respect to the brush $d^3$ and the pins $d'$, except in this latter case the brush rests upon the inner row of pins. The brushes, passing thus over the pins and short-circuiting them as described, act to send over both legs of the subscriber's line and the ground a series of impulses determined by the number of contacts of the series $c$ and $c'$ connected to earth, all of which will be hereinafter more fully described. The pins $d$ and $d'$ are mounted upon a ring of insulating material $D^0$. The brushes $d^2$ and $d^3$ are carried by arms mounted fast to an insulating support $d^4$, which in turn is made fast upon a rotatable spindle $d^5$, carrying a pinion $d^6$, meshing with a gear $d^7$, which is mounted loosely upon a rotatable spindle $d^8$, to which is secured one end of a mainspring $d^9$, having its other end made fast to the upper plate of the frame of the instrument. A pawl $d^{10}$, mounted upon the gear $d^7$, engages a ratchet $d^{11}$, mounted fast upon the spindle $d^8$, and acts to communicate the motion imparted to the spindle by the spring $d^9$ to the gear $d^7$ and then to the pinion $d^6$ and spindle $d^5$, which rotates the brushes on the rotary contact-maker. The spindle $d^8$ is connected through a train of gearing to an escapement-wheel $d^{12}$, provided with an escapement-detent $d^{13}$.

E represents the calling-knob, mounted upon a rotatable spindle $e$, mounted in the frame of the instrument and attached through the instrument-casing, so that it will always be accessible to the subscriber. By operating this calling-knob several acts are performed—first, the spring $d^9$ of the rotating contact-maker is wound up, thus setting that part of the instrument for operation; second, two ground connections are made, and, third, the machine is locked and prevented from being tampered with until the complete signal is sent. For this purpose the spindle of the calling-knob carries an arm $e'$, fixed rigidly thereto, which is provided at its outer end with a pin $e^2$, adapted to engage when operated the end of a lever-arm $e^3$, pivotally connected to the ends of the arms $e^4$ and $e^5$, respectively, the latter being mounted at one end fast upon the spindle $d^8$ of the rotating contact-maker, and the arm $e^4$ mounted upon a spindle $e^6$ and carrying a pin $e^7$, which when the calling-knob is operated is adapted to be sent into engagement with and thus short-circuit the ground-spring terminals $e^8$ and $e^9$. This act of operating the calling-knob, which sends the arm $e'$ in the direction of the arrow shown in Fig. 6, also winds up the spring $d^9$ by causing the ratchet $d^{11}$ to advance one tooth under the pawl $d^{10}$.

For the reliable working of the exchange there are certain conditions which the sender must fulfil, the most important of which is the transmission of the correct signal. Outside of the electrical construction and the positive manner of making contact errors in transmission may result from accidental or intentional tampering or interference with the sender. Consequently this instrument must be free from such interference. In other words, when the subscriber has set his sender so that the number desired is displayed at the glass opening and has turned his calling-knob the sender is positively locked against any further interference on the part of the operator until the signal for which it has been set has been sent. This is accomplished by a series of protective devices the office of which is mainly to compel the user to go through all operations necessary in order to send the complete signal. If the user neglects this, no signal at all will be sent. This protection is partially electrical, as the circuit is not entirely completed until the last operation of the series on the part of the user has been completed, and is partially mechanical, comprising a system of mechanical locks compelling the user to go through a series of operations in a predetermined order of rotation. Thus while the user can at will change from one number to another before he finally turns the calling-knob the act of turning this knob puts the instrument entirely beyond his control until the complete signal has been sent. This is a very important and necessary feature, as otherwise a mutilated or incomplete signal sent would disable the sender and line until such time as the sender could be put right by some skilled person.

The mechanical locking devices comprise a detent for locking each of the number-dials against operation after the calling-knob has been turned and an escapement-detent and a series of locking-levers for locking the rotating contact-maker D against operation until the sender is started by an impulse from the central exchange, these locks being correlated in such a way as to make each successive act of the user dependent upon his having first performed the next previous act.

The detent-locking mechanism for locking the number-dials is shown most clearly in Fig. 9, which represents this mechanism as lifted off the top of the mechanism shown in Fig. 6, the upper plate of the frame of the instrument being shown in dotted lines. This mechanism comprises a pair of detent-levers $c^3$, pivoted to the upper plate of the instrument-frame, each of which is adapted to engage a toothed disk $c^4$, carried by the spindles $a$ and $a'$. The ends $c^5$ of the detent-levers $c^3$ are during the time that the instrument is at rest opposite the openings $c^0$ of the flanged disk $c^6$ upon shaft $e^6$. Hence the disks $c^4$, and therefore the spindles $a$ and $a'$, may be rotated and the number-dials adjusted; but when the sender is set the openings in the disk $c^6$ are rotated past the ends $c^5$ of the detent-levers, so that these levers will be brought into engagement with the periphery of the disk, and thus it will be seen that the pins $c^7$ of the detent-levers cannot be raised out of the teeth of the disk $c^4$. Hence the spindles $a$ and $a'$ will be locked against rotation, and the number-dials therefore cannot be tampered with. The disk $c^6$ is rotated to this locking position by the operation of the calling-knob through the medium of the levers $e^3$ and $e^4$.

The locking mechanism, which prevents the operation of the rotary contact-maker until the proper time, consists of a series of locking-levers and related parts, which include a disk $e^{10}$, mounted fast upon the spindle $e$, and the system comprising the levers $e^{11}$ $e^{12}$ $e^{13}$, and the pivoted catch $e^{14}$, the latter being a part of the magnetic release comprising a pivoted armature $f$, with which the pivoted catch $e^{14}$ is integral, and an electromagnet F. The lever $e^{11}$ carries a contact-maker $e^{15}$, comprising a metal ring mounted upon insulating material. This contact-maker is adapted when the instrument is set to engage and complete an electric circuit through contact-springs $e^{16}$, which form a part of the ground connection. When the subscriber turns the calling-knob to set the instrument, the lever $e'$, being sent into engagement with the lower end of the lever-arm $e^3$, will set the locking mechanism in the position shown in Fig. 7, the positions that the parts occupy in Fig. 6 being the positions of rest. From Fig. 7 it will be seen that the lever $e^{12}$ has caused the pin $e^{18}$ upon the upper end of the lever $e^{13}$ to engage the shoulder of the latch $e^{14}$, which engages the end of the escapement-detent $d^{13}$ and locks this detent against vibration, and it will also be seen that in this position of the locking mechanism the pin $e^7$ is sent into contact with the ground-terminals $e^8$ and $e^9$. This, however, does not complete the ground connection. When the operator releases the calling-knob, the lever $e'$ flies back to the position of rest (shown in Fig. 8) under the tension of the spring $e^{20}$, the disk $e^{10}$ of course rotating with it. When this disk has returned to the position of rest, the lever $e^{11}$ will drop into the notch $e^{19}$, and thus bring the contact-maker $e^{15}$ into engagement with the contact-springs $e^{16}$. This completion of the circuit to the ground through the contact-springs $e^{16}$ is the last operation performed in setting the sender, and as it is essential that this ground connection be made before any connection between the central exchange and the sender can be had, it will therefore be seen that it is necessary to perform all the operations of setting the sender before any signal at all will be sent.

The action of the magnetic release and its connection with the locking mechanism of the sender will be more clearly understood and more fully described when the operation of the system from beginning to end will be taken up.

The sender is provided with a suitable base-plate and may, as hereinbefore stated, be located in any position accessible to the subscriber.

Each subscriber's line carried into the central exchange is connected to two separate parallel rods H, mounted in insulating-plates $h$, secured to rearwardly-extending brackets $h'$, which are bolted to the frame I of the switchboard, as at $h^2$. (See Figs. 20 and 21.) For each line I provide a subscriber's terminal-switch, which comprises a carriage K, mounted to travel on a pair of said rods. Each carriage carries the subscribers' terminal-springs $k$ and $k'$, mounted upon the members $k^2$ and $k^3$, which are insulated from each other, but each of which is in electrical contact with one of said carriage-rods. These terminal-springs are adapted to pass by and to make contact with a series of conductors, shown in the present case as bars L, disposed at right angles to the direction of the movement of said springs. The bars or other conductors L are of such dimensions as to have negligible ohmic resistance and are in pairs connected to corresponding loop-circuits, which comprise impedance-coils and heavy leads connected to the terminals of a source of electrical energy—such as a battery or dynamo—in the manner of central-energy practice. These conducting-bars and loop-circuits together constitute the cord-circuits of my exchange and correspond exactly in function to the well-known cord-circuits of manual exchanges. The bars L, therefore, forming the cord-circuit terminals, will be designated as such throughout the description and claims, since I do not confine or limit myself to any specific form of cord-circuit terminal, such as the bars herein shown. It will thus be seen that the subscribers' terminal switches or carriages are in reality movable spring-jacks corresponding to the spring-jacks of a manual exchange, except that the latter are stationary. This manner of connecting the subscribers' lines is in automatic exchange practice broadly new and differs fundamentally from all prior devices for accomplishing the same end. The number of subscribers' terminal switches or carriages therefore will be equal to the number of subscribers' lines; but the number of cord-circuits that I employ is equal to ten per cent. of the number of subscribers, as this has been found to be a safe percentage of the number of lines in use at one time. I thereby greatly reduce the number of contacts, wires, and connections by which all of the subscribers could talk at the same time and which in practice has been found to be entirely unnecessary. In the position of rest the carriages all occupy the position shown in full lines in Fig. 20, and one terminal-spring of each carriage—that is, the spring $k$—is in contact with what I term a "ground-terminal" spring $k^4$, made fast to and insulated from the frame of the switch-board, and it is through these springs $k^4$ that the terminal-springs of the carriages are placed in electrical connection with a commutator device, hereinafter described, and ultimately at intervals with the ground. Movement is imparted to the carriage through a shuttle M, comprising a sector-gear and shuttle-arm connected to the carriage by means of the shuttle-connecting rod $m$. There are as many of these shuttles as there are carriages, and each is pivoted in the end of a shuttle-carrier M', which latter being mounted to rotate upon a shaft $m'$ allows the shuttle movement in two directions. (See Figs. 20 and 21.) Each shuttle carrier and its shuttle and carriage are normally held in the position of rest by a shuttle-retaining lever $m^2$, pivotally mounted upon and insulated from the frame of the switchboard, as shown at $m^0$. These shuttle-retaining levers $m^2$ are in the nature of latches and are provided at one end with a projection or shoulder $m^3$, which engages the upwardly-extending portion $m^4$ of the shuttle-carrier. The retainers are returned to their normal positions by means of the spring $m^5$. The portion $m^4$ of the shuttle-carrier also acts as a rest for the shuttle-arm $m^6$, which latter is provided with the shuttle-adjusting screw $m^7$, and the shuttle-arm is normally held in engagement with the portion $m^4$ of the shuttle-carrier by the spring $m^8$ or its equivalent, all of which is shown most clearly in Figs. 20 and 21. When at rest, the terminal-spring carriage, carriage-rod, shuttle, shuttle-carrier, and shuttle-retainer occupy the position shown in full lines in Fig. 20. The carriages are moved into the second or selective position by a signal sent into the exchange from the subscriber, which releases the shuttle-retainer of the shuttle connected to the carriage of the calling subscriber and allows the shuttle to drop by gravity into the position shown in dotted lines in Fig. 20. When this takes place, the teeth of the shuttle-sector engage a shuttle-operating pinion N, made up of a plurality of rods $n$, extending longitudinally of the switchboard and journaled in suitable brackets $n'$, bolted to the switchboard-frame. It is by the operation of this pinion that the shuttle is further shifted and the carriage sent into the third or talking position—that is, into that position where its terminal-springs will be brought into engagement with a set of cord-circuit terminals. The means by which this pinion is operated will be hereinafter fully described. The shuttle-retainers are operated and thereby made to release the shuttles and allow them to drop into the selective position partly by means of a device which I designate the "busy-wheel" P, which consists of a number of resilient radial fingers $p$, mounted upon a shaft $p'$, extending longitudinally of the switchboard and journaled in bearings $p^2$, insulated from the switchboard-frame.

The fingers of the busy-wheel correspond in number to the number of subscribers and are disposed around the shaft $p'$ in the form of a helix of one turn, the axial distance between the fingers being the same as the distance between the shuttles. This busy-wheel, as will be seen more clearly later, continues to rotate so long as no switching is going on, but stops momentarily to in part effect the switch. The shuttle-retaining levers $m^2$ extend to a point above the shaft of the busy-wheel, so that the ends of the said levers will be in a line measured axially along the busy-wheel shaft with that one of the busy-wheel fingers which occupies the vertical position, and therefore, owing to the spiral arrangement of the fingers, only one finger can at one time occupy that position. Parallel with the busy-wheel shaft and preferably above it is journaled an axially-movable rack Q, whose teeth $q$ lie at successive intervals in the axial path of the ends of the busy-wheel fingers, the intervals being due to the spiral arrangement of the fingers. (See Fig. 13.) These busy-wheel fingers are made of resilient material, as above mentioned, preferably thin steel, and are capable of being sprung axially under the action of the rack Q when the latter is moved longitudinally, and these fingers in turn engage when so sprung the ends of the shuttle-retaining levers $m^2$, with the result of liberating the latch end of the lever from the shuttle-carrier which it engages, and thus dropping the shuttle into engagement with the shuttle-pinion N. As only one tooth at a time can thus be sprung, it follows that only one shuttle can be dropped at a time.

The next group of parts comprises the power device, the selector with its rotating contact-maker and local circuit, the ringer and ringer-controller, and the busy test.

The power device brings about all the mechanical actions necessary in the exchange to establish and disestablish a switch. This device is driven by any available source of power and is a combination of constantly-moving parts with other parts whose motion is intermittent. These latter motions are under the control of magnets, which in turn are controlled by the subscriber's station direct and through the selector. This power device is preferably mounted upon one end of the switchboard and is shown in the accompanying drawings most clearly in Figs. 10 to 19, inclusive, where R represents the power-pulley or its equivalent, which is connected to any desired source of power, such as an electric motor. This pulley is mounted upon a power-shaft $r$, which it keeps constantly rotating. This power-shaft carries two pinions $r'$ and $r^2$, the former of which imparts motion through the gear $r^3$ and pinion $r^4$ to a gear R′, which is frictionally rotatable upon the busy-wheel shaft $p$. This train of gears and the power-shaft constitute a portion of the constantly-moving parts of the power device. The gear R′ is held in frictional engagement with a ratchet-wheel R², mounted fast upon the shaft of the busy-wheel, being forced under the tension of the spring $r^0$ into engagement with a preferably leather washer $r^5$, inserted between it and the ratchet. The tension of this spring is adjustable by means of the nuts $r^6$ upon the end of the shaft. By this arrangement the ratchet-wheel R², which drives the busy-wheel, will rotate together with the gear R′, but may be stopped at any point, when the said gear will continue to rotate. The means for thus stopping the busy-wheel ratchet and hence the busy-wheel, which is the beginning of the operation of switching in the exchange, comprises a stop mechanism consisting, among other parts, of a pawl $r^7$, carried upon the shaft $r^8$. The portion of this pawl which comes into engagement with the ratchet is insulated from the rest, as the said ratchet and busy-wheel form a part of an electric circuit, which will be later described. This pawl is held up out of engagement with the ratchet R² by means of an upwardly-extending lever-arm $r^9$, which normally engages at its upper end a pin $s^0$ upon the armature $s$ of the starting-magnet S. (See Figs. 13 and 17.) This single starting-magnet initially controls the whole switching operation of the exchange. The magnet S, together with a restarting-magnet S′, is mounted upon a plate $S^0$, bolted to the end of the switchboard-frame. The armatures $s$ and $s'$ of these magnets are pivoted in the brackets $s^2$ and are mechanically coupled in such manner (see Fig. 17) that while the magnet S when energized will move its armature only the magnet S′ when energized will move both armatures. The reason for this will appear more fully later. The armatures $s$ and $s'$ normally rest upon the tops of lugs $s^3$ and $s^4$, forming a part of two plates $s^5$ and $s^6$, pivoted as at $s^7$, Fig. 17. The plates $s^5$ and $s^6$, pivoted in the manner shown, have normally a tendency to rotate on their pivots toward each other—that is, they have a tendency to drop inward. Normally, however, they are prevented from doing this by the engagement of the lugs $s^3$ and $s^4$ with the shoulders $s^8$ and $s^9$ upon the magnet-armatures, the said armatures being provided with adjusting-screws $s^{10}$, which normally engage the tops of said lugs. It will now be seen that when the starting-magnet S becomes energized and attracts its armatures the latter will release the lever-arm $r^9$, which being drawn by the spring $r^{10}$ will drop the pawl $r^7$ into engagement with the ratchet R² and thus stop the busy-wheel. The plates $s^5$ and $s^6$ constitute a part of the mechanism for actuating a master-shaft T. Motion is imparted to the master-shaft through the gears $t$, $t'$, and $t^2$, the former meshing with the pinion $r^2$ on the constantly-rotating power-shaft and the gear $t^2$ carrying a floating clutch T′. The constantly-moving portion of the floating clutch comprises a cam $T^2$, provided with a series of pivoted dogs $t^3$ and a series of rocking cams $t^4$ $t^5$. The object in employing a plurality of these cams and dogs is to gain time. The loose member of the clutch comprises a circular plate or disk $T^3$, mounted fast on the master-shaft and provided with a notch $t^0$ in its periphery with which any of the pins $t^6$ of the pivoted dogs $t^3$ are adapted at times to engage and in this manner to impart motion to the master-shaft. The connection between the fast and loose members of the clutch, and therefore the rotation of the master-shaft, is brought about in the following manner: Normally the rocking cams $t^5$ will occupy the positions shown in dotted lines in Fig. 17, when the ends of the cams $t^4$ will engage the dogs $t^3$, as shown also in Fig. 17, and cause the pins $t^6$ to be raised under the tension of the spring $t^7$ clear of the disk $T^3$ of the master-shaft. When, however, the starting-magnet is energized, its armature $s$ will be drawn up, and this will release the plate $s^5$, which will drop until its stop-lug $s^{11}$ strikes the pin $s^{12}$. When this takes place, the pin $t^{13}$ of the plate $s^5$ will lie in the path of the cams $t^5$ and will engage the shoulder $t^{14}$ of the first one of the series which comes along. Striking the shoulder $t^{14}$ in this manner rotates the cam $t^5$ a limited distance, which through the spindle $t^{16}$ imparts a limited rotation to the cam $t^4$ of the said spindle, bringing the flat face of said latter cam into contact with the lever-arm of the dog $t^3$, (see Fig. 18,) thus causing the pin $t^6$ to bear under the tension of the spring $t^7$ upon the periphery of the disk $T^3$ and eventually pass into the notch $t^0$. This couples the loose and fast members of the clutch and starts the master-shaft. As soon, however, as the clutch has rotated through an angle of about thirty degrees the lower shoulder of the cam $t^5$ will engage the pin $t^{17}$ upon the plate $s^6$. This will set the cam $t^4$ back in its normal position, (shown in Fig. 17,) lifting the pin $t^6$ out of the notch $t^0$, and thus separating the fast and loose members of the clutch and causing the master-shaft to stop. By this operation the first shuttle has been dropped, and the parts of the power device assume their initial positions. The remaining three hundred and thirty degrees of the revolution of the clutch is devoted to dropping the shuttle of the called subscriber.

In order to restart the master-shaft for the purpose of dropping the shuttle of the called subscriber, I provide the restarting-magnet S′, which upon becoming energized, as will be described, attracts its armature $s'$, which releases the plate $s^6$ and allows it to drop. At the same time, owing to the connection between the armatures $s'$ and $s$, the latter will release the plate $s^5$ and the arm $r^9$. It will then be seen that the pin $t^{13}$ will be thrown into the path of the cams $t^5$ again, and the first one that engages the said pin will restart the master-shaft, as described for the first operation. Having rotated about three hundred and thirty degrees, the clutch will become uncoupled, when the master-shaft will again stop. Upon one revolution of the master-shaft all necessary operations to complete a switch are gone through. For the purpose of disengaging the clutch and resetting its related parts at the end of a switching operation I provide a resetting-wheel $T^5$, carrying pins $t^{26}$, $t^{27}$, and $t^{28}$. The pins $t^{26}$ are adapted to engage the resetting-lever $t^{19}$ and the pins $t^{27}$ the resetting-lever $t^{20}$, carried upon the pivotal supports of the plates $s^6$ and $s^5$, respectively, thus restoring these plates to their normal positions. (Shown in Fig. 17.) The pins $t^{28}$, engaging the resetting-lever $r^{10}$, will restore the arm $r^9$ to its position behind the pin $s^0$. The starting and restarting magnets S and S' operate in conjunction with the subscriber's sender through the medium of a central-exchange rotating contact device U and a selector V.

The rotating contact device is shown most clearly in Fig. 28, and consists, among other parts, of two sets of circularly-disposed contact points or pins $u$ and $u'$, each set containing as many pins as there are subscribers, and two metal contact-rings $u^2$ and $u^3$, the ring $u^2$ being divided in the case illustrated into ten equal segments, while the ring $u^3$ is continuous. It is assumed in this case that each set $u$ $u'$ comprises one hundred pins. Sweeping over these contacts is a normally-rotating trailer $u^4$, provided with brushes $u^5$, $u^6$, $u^7$, and $u^8$. These brushes are carried by the trailer upon an insulated plate $u^9$; but the brushes $u^5$ and $u^7$ are electrically connected, as are also the brushes $u^6$ and $u^8$. This trailer is preferably mounted upon the shaft of the busy wheel, though it is obvious that it may be located in any desired position. Each of the contact-pins $u'$ is connected to a separate ground terminal spring $k^4$, while the contact-ring $u^3$ is connected in circuit with the starting-magnet S, battery X, contact device J, and a permanent ground. (See the diagram, Fig. 2.) The contact device J comprises the contact-springs $j$, connected in circuit with the battery X and normally short-circuited through a metal plate $j'$, mounted upon the periphery of the resetting cam-wheel $T^5$. This contact device thus prevents the magnet S' from being operated by another subscriber while a switching operation is going on, as its circuit is broken by the wheel $T^5$ at all times except when the master-shaft is idle. This contact device may obviously be located in any other desired position without altering the principle of its operation. In this way a metallic path or circuit is established between said ground-spring and the ground every time the trailer-brush passes over the pin connected to the ground-spring. This is broadly new, abolishes all individual magnets, (one for each subscriber,) brings the subscribers into a fixed rotation, prevents double or mixed use of the power device, and is, in fact, one of the most important features of the present invention. It will also be noted from the apparatus described so far that there are no cross or multiple connections of the subscriber's individual circuit whatever, even the ground-taps being broken upon the carriage leaving the position of rest. Consequently a perfect balance of circuit and a perfect isolation of the conversing pairs from others are obtained. This is also broadly new and overcomes the principal difficulty encountered in the art. The contact-pins $u$ are divided into groups of ten contacts in each group and cross-connected, as shown in Fig. 28—that is, the first pin of the first group is connected to the first pin of each succeeding group, the second pin of the first group connected to the second pin of each succeeding group, and so on through the series. One of the ten wires $u^{11}$ therefore connects to pins 1, 21, 31, 41, 51, 61, 71, 81, and 91, another of said wires connects to pins 2, 22, 32, 42, 52, 62, 72, 82, and 92, and so on to the last wire, which connects to pins 0, 10, 20, 30, 40, 50, 60, 70, 80, 90, and 100. The segments $u^2$ are of such length that each embraces ten pins $u$— that is to say, while the brush $u^7$ is passing over one segment the brush $u^5$ passes over ten pins. By this manner of grouping I am enabled by twenty wires—ten connected to the contact-pins $u$ and ten to the segments $u^2$—to obtain combinations sufficient for one hundred subscribers. The wires $u^{11}$ are led to ten contacts $v$ of the selector, (see Fig. 2,) while the ten segments $u^2$ are connected to ten contacts $v'$ of the selector, the contacts $v'$ comprising the units and the contacts $v$ the tens of the number of the called subscriber. The selector-contacts $v$ and $v'$ are swept over by the brushes $v^2$ and $v^3$, respectively, which short-circuit the contacts successively with the segments $v^4$ and $v^5$. These segments are connected in circuit with the restarting-magnet S' and battery X', which circuit includes a time contact-maker $v^6$, operated by a retarding device hereinafter described.

V' and V² represent the selector-magnets, each of which is connected in circuit with one of the power-bars L' and each in circuit with one leg of the subscriber's metallic circuit and ground through a battery $X^2$. These magnets are controlled by the subscriber's sender and receive impulses over the subscriber's line and ground, which cause them to oscillate the pallets $v^7$ $v^8$, which through proper mechanism impart motion to the brushes $v^2$ and $v^3$ and cause them to complete, through the contacts $v$ $v'$ and the rotating contact-maker U, the circuits corresponding to the number or signal sent in from the subscriber. This causes the restarting-magnet S' to operate and to indirectly drop the shuttle of the called subscriber. The circuit so established therefore bears a fixed relation to the signal sent, and any one particular signal, no matter from which subscriber's senders, will invariably result in the establishment of one particular circuit through the rotary contact-maker U and restarting-magnet.

The mechanism of the selector is most clearly shown in Figs. 10, 33, and 34 and is provided with a suitable metal frame, in the front and rear plates of which are journaled spindles $v^{11}$, $v^{12}$, and $v^{13}$. The spindles $v^{11}$ and $v^{13}$ carry the brushes $v^2$ and $v^3$, respectively, while the central spindle $v^{12}$ carries the time brush or contact-maker $v^6$. Loosely mounted upon the spindles $v^{11}$, $v^{12}$, and $v^{13}$ are the gears $v^{14}$, $v^{15}$, and $v^{16}$, respectively, which mesh with each other, as shown most clearly in Fig. 34. Just above these gears are three ratchet-wheels $v^{17}$, $v^{18}$, and $v^{19}$, which are fast upon the said spindles. The spindles each have rotation imparted to them through coil-springs $v^{20}$, which rotation is imparted, through the ratchets $v^{17}$, $v^{18}$, and $v^{19}$ and pawls $v^{21}$ $v^{22}$ $v^{23}$, to the three separate gears $v^{24}$, $v^{25}$, and $v^{26}$, carrying said pawls, and which mesh, respectively, with the pinions $v^{27}$, $v^{28}$, and $v^{29}$. The spindle upon which the pinion $v^{28}$ is mounted is provided with an ordinary clock-escapement $v^{30}$ and forms a timing or retarding device which allows the gear $v^{25}$ to rotate slower than the gears $v^{24}$ and $v^{26}$, and thus to bring the contact-maker or brush $v^6$ into engagement with the contacts $v^0$ after the brushes $v^2$ and $v^3$ have rotated to the positions that they should occupy upon the segments $v$ and $v'$. In this manner the circuit of the restarting-magnet S' is never completed until the entire signal has been received by the selector. The pinions $v^{27}$ and $v^{29}$ are governed by the escapements $v^{31}$ and $v^{32}$, which can oscillate only when motion is imparted to the pallets from some outside source, this source being the selector-magnets V' and V². Thus no mechanical work is done by these magnets other than oscillating the selector-pallets. Immediately after each operation the selector-springs are automatically wound up and the selector reset. This is done by connecting a lever $v^{33}$, one end of which is pivoted to the gear $v^{15}$ and the other end to an arm $v^{00}$, carried upon the shaft which carries the lever which lifts the shuttles into the locked position hereinafter described. When the lever $v^{33}$ is sent in the direction of the arrow, Fig. 34, by the arm $v^{00}$, the gear $v^{15}$ will be rotated. This will cause the gears $v^{14}$ and $v^{16}$ also to rotate to a limited extent. By thus rotating the gears $v^{14}$, $v^{15}$, and $v^{16}$ pins $v^{34}$, $v^{35}$, and $v^{36}$, carried by said gears, are brought into engagement with pins $v^{37}$, $v^{38}$, and $v^{39}$, respectively, carried by the ratchets $v^{17}$, $v^{18}$, and $v^{19}$, which, being fast upon the spindles $v^{11}$, $v^{12}$, and $v^{13}$, will rewind the springs and reset the brushes.

In order to prevent any premature action on the part of the selector, the escapement mechanism is locked until started by the selector-magnets. This is done by providing the locking-rod $v^{40}$, which is carried by one of the brush-supports and when the selector is at rest or set ready for operation engages a pin $v^{41}$ upon a depending arm $v^{42}$, carried by the central escapement in the form of a pendulum.

The selector-magnets are bolted to a suitable yoke $v^{43}$, secured to the selector-frame, and the armatures of these magnets are held in the normal positions by springs $v^{44}$, attached to the milled screws $v^{45}$.

The selector is preferably mounted upon the end of the switchboard, as shown in Fig. 10, though it may be located wherever desired.

The master-shaft, forming a part of the power mechanism, to which reference will again be had, carries a series of cams, one of which oscillates the rack Q for dropping the shuttles. This is the cam Q', and in addition to acting peripherally acts axially by means of the cam-faces $q'$ and $q^2$, which engage a roller $q^3$, carried upon a pivoted arm $q^4$, which is in turn pivotally secured to the head $q^5$ of the said rack. (See Figs. 13, 15, and 16.) The head of the rack is insulated, as at $q^6$, for purposes which will hereinafter more fully appear. When a shuttle is dropped by the lateral movement of the rack Q, as described, it drops into engagement with the pinion N, and the parts assume the position shown in Fig. 20, as described. In this position, which I call the "selective" position, the carriage terminal-springs are brought into engagement individually with one each of a pair of insulated conducting-bars L', which I term "power-bars," arranged, preferably, parallel to the conducting-bars L, forming the cord-circuit terminals. After the carriage and shuttle of the calling subscriber have remained in the selective position for a definite time the second shuttle or the shuttle of the called subscriber is dropped, and both are sent into one of the ten talking positions—that is, the carriage terminal-springs are sent into engagement with one of the ten pairs of cord-circuit terminals. This is done by rotating the shuttle-pinion N. The means that I employ for this purpose comprise a cam W, keyed on the master-shaft, a bell-crank lever $w$, provided with a roller $w'$, which engages said cam, an adjustable connecting-rod $w^2$, connecting the free end of the lever $w$ to an arm $w^3$, made fast on the shaft $w^4$, journaled in a bracket $w^5$, (see Figs. 11 and 14,) and a sector-gear $w^6$, which meshes with a pinion $w^7$, keyed on the shaft of the shuttle-pinion N. A weight $N^2$, suspended from a pulley $N^3$ on the shaft of the pinion N, furnishes the power for rotating the same and retaining the roller of the cam-lever $w$ in contact with the cam. The extent, therefore, of the rotation of the shuttle-pinion N determines which of the ten talking positions or into engagement with which pair of cord-circuit terminals the terminal spring-carriages will be brought and this in turn governed by the extent of the movement of the cam-lever $w$. The movement of the cam-lever $w$ is limited by a stop-lever $w^8$, which carries at its upper end a detent $w^9$, which is adapted to impinge on one of a series of oscillating stops $w^{10}$, depending upon which of said stops lies in the path of said detent. These stops $w^{10}$ are ten in number in the case illustrated and are mounted upon the shafts $w^{11}$, arranged in the arc of a circle and journaled in a forward extension I' of the frame of the switchboard. Each stop is provided with a lug $w^{12}$, (see Fig. 23,) preferably made integral therewith, and these lugs engage each a separate detent $w^{13}$, mounted fast on a series of shafts $w^{14}$, arranged in a straight line and carrying a series of levers $w^{15}$, which form a part of the clearing-out device hereinafter described. The peculiar variation in the shapes of the lugs $w^{12}$ and detents $w^{13}$ is rendered necessary, owing to the different manner in which the series of shafts $w^{11}$ and $w^{14}$ are disposed. The stop-lever detent $w^9$, impinging upon the oscillating stops, engages them in such a way as to force them beyond its normal sweep. At the same time the detents $w^{13}$ engage the lugs $w^{12}$ in such manner as to hold the said stops clear of the sweep of the lever-detent $w^9$ even after the return of the stop-lever. Normally with the exchange idle all stops are in the down position, remembering that the stop-lever acts only when the master-shaft acts, so that the stop-lever cannot travel any farther than the first stop, which it sends out of its path and then returns to rest. On the next trip the stop-lever would pass the first stop and engage the second, and so on until all ten stops are sent up clear of its sweep, when it can make a full stroke. Inasmuch as every time the lever engages a stop the shuttle-pinion will rotate to a corresponding extent, the terminal spring-carriages, and therefore the shuttles, will in pairs occupy all of the ten talking positions. It will be shown later how if an eleventh pair of shuttles had been dropped they would be returned to the position of rest and not allowed to remain in the talking position. It is not necessary that the talking positions occur in regular order or rotation, as this occurs only when the exchange starts. Afterward idle positions occur out of regular order owing to the difference in the length of conversations, and the carriages will be sent into engagement with the first pair of idle cord-circuit terminals determined by the stops which the stop-lever first engages. In the case of an unsuccessful or busy call the stop struck is immediately released, together with its shuttle-lock, as will be hereinafter fully described. This must be done, as otherwise positions might be made permanently inaccessible for later calls. The shuttles after bringing the carriages into the talking position are, until the calling subscriber hangs up his receiver, held in a locked position free from reach of the power mechanism, and therefore not affected by subsequent movements of the same. For this purpose I provide a series of shuttle-locks corresponding in number to the talking positions. These shuttle-locks consist each of a fulcrum-rod $m^9$, extending in a plane parallel with the bus-bars, and consequently in a plane at right angles to the travel of the shuttles, and a second rod $m^{10}$, parallel with the fulcrum-rod and rotatable around the same within limits. The fulcrum-rods are journaled at their ends in supports $m^{11}$, secured to brackets $m^{12}$, bolted to the frame of the machine. (Shown most clearly in Figs. 20 and 21.) An arm $m^{13}$ on the shuttle-connecting rod $m$ in the nature of a latch engages the rod $m^{10}$ when thrown into the locked position and is released therefrom by the rotation of the said rod to a limited extent around the fulcrum-rod. (See Fig. 21.) This rotation is effected by the clearing-out device acting upon the shuttle-releasing gear, which will be described later. The shuttles are thrown into the locked position by the shuttle-lifting bar N' in the form of two rods connected by a flange. (Shown most clearly in section in Figs. 21 and 22.) This bar extends longitudinally of the switchboard normally beneath the shuttles and is carried by the lever-arms $n^2$, made fast upon the shaft $n^3$, which is rotated to a limited extent to cause the lifting-bar to engage the teeth of the shuttle-sector (see Fig. 21) and send it into the locked position, which takes place just after the shuttle-shifting cam W has acted to bring the carriages into the talking position. This limited rotation is imparted to the shaft $n^3$ by means of the roller $q^0$ on the cam Q', which engages a lever-arm $n^4$, mounted on the shaft $n^5$ and connected by means of the adjustable connecting-rod $n^6$ with a crank-arm $n^7$ upon the same shaft with the shuttle-lifting levers $n^2$. The shaft $n^5$, rocked by the lever $n^4$, also carries the lever-arm $v^{00}$, which rewinds or resets the selector.

When both calling and called subscribers' shuttles are dropped and sent into the locked position, each subscriber's bell will ring, when the receivers may be taken down and the conversation carried on. The ringer that I employ may be of the ordinary magneto type Y, Fig. 2, which need not be described. This ringer is constantly driven and is connected to a ringer-controller which sends out and times the length of the signal by throwing the ringer in multiple with the pair of cord-circuit terminals to which the carriage-spring terminals are at that time connected. The ringer-controller is also used to temporarily short-circuit the clearing-out magnet until the subscriber takes down his receiver, the object of which will be hereinafter explained. The ringer-controller (shown most clearly in Fig. 10, 11, and 22) is made up, among other parts, of a plurality of frictionally-rotatable controller-disks Y', corresponding in number to the cord-circuits. These disks are made, preferably, of insulating material and each mounted loosely upon a collar $y$, keyed upon a shaft $y'$. Alternating with the disks $Y'$ are a series of friction-disks $y^2$, engaging the recessed faces of the controller-disks and also keyed on the shaft $y'$, but are capable of longitudinal movement on the shaft, as are also the collars $y$. A spring $y^3$, acting against a plate $y^4$ at one end of the controller, normally presses the disks against each other, and in this way causes sufficient friction between the controller-disks $Y'$ and the friction-disks $y^2$ to cause the former to rotate as the latter are rotated. I am by this arrangement enabled to stop the rotation of any of the controller-disks $Y'$ while the rest of the controller continues to rotate. The controller-shaft $y'$ rotates constantly, receiving its motion from a vertical shaft $y^5$ through the bevel-gears $y^6$ and $y^7$, and this shaft in turn receives its motion from the shaft $y^8$ through the bevel-gears $y^9$ and $y^{10}$, the said latter shaft being geared through the train of gears $y^{11}$ $y^{12}$ $R'$ $r^3$ $r^4$ and pinion $r'$ to the power-shaft $r$. Upon the periphery of each controller-disk $Y'$ are three metal contact-strips $y^{13}$, $y^{14}$, and $y^{15}$, the former two extending around about three hundred and thirty degrees of the circumference and the latter about one hundred and eighty degrees of the same. These strips $y^{13}$, $y^{14}$, and $y^{15}$ are adapted when the disks rotate to engage the contact-brushes $y^{16}$, $y^{17}$, and $y^{18}$, respectively, mounted upon a plate of insulation $y^0$, as shown most clearly in Figs. 11 and 22. Each brush $y^{16}$ is connected through the ringer to a corresponding contact-stop $y^{19}$ of the ringer-controlling magnets $Y^2$, and each brush $y^{17}$ is connected to the contact-lever $y^{26}$ of one of said magnets. (See the diagram of connections, Fig. 2.) A second series of brushes $y^{20}$ connect the strips $y^{13}$ and $y^{14}$ in multiple with their respective bus-bar circuits and the strips $y^{15}$ to the battery X, from which the talking-current is derived. The office of the strips $y^{15}$ is to complete, through the brush $y^{18}$, a short circuit including the clearing-out magnet Z, which preserves the connection through said magnet until the subscriber takes down his receiver. At the end of a predetermined interval—that is, as soon as the strip $y^{15}$ leaves the brush $y^{18}$—the short circuit will be broken. Normally the controller-disks $Y'$ remain at rest, being prevented from rotating by the levers $y^{21}$, which in their normal positions engage each a lug $y^{22}$ upon the periphery of each controller-disk. (See Figs. 11 and 12.) In this position the controller-disks are said to be in the position of rest. When, however, any of the levers $y^{21}$ are operated, which sends them into the position shown in dotted lines, Fig. 12, the lug $y^{22}$ will be disengaged and the disk carrying the lug will, owing to its frictional mounting on the shaft $y'$, rotate, and thus bring the strips $y^{13}$, $y^{14}$, and $y^{15}$ in contact with their respective brushes. A second lug $y^{23}$, located about thirty degrees in advance of the lug $y^{22}$ and in the path of the lever $y^{21}$ after it has been shifted clear of the lug $y^{22}$, thus limits the rotation of the disk by engaging the lever $y^{21}$ in its new position. This arrangement allows the controller-disk to rotate about three hundred and thirty degrees, during which time the ringer may send its signal. When stopped by the lug $y^{23}$, the controller-disk will be in the talking position. The levers $y^{21}$ are operated by the shuttle stop-lever $w^8$ impinging upon one of the stops $w^{10}$. In other words, every time one of the shafts $w^{11}$, Fig. 23, is rocked by the stop-lever $w^8$, as hereinbefore described, the lever $y^2$, carried by that shaft, will release the controller-disk corresponding to the stop actuated. When the clearing-out magnets operate, they restore the levers $y^{21}$ to their original positions and allow the controller-disks operated to rotate through a small arc—that is, the distance between the lugs $y^{22}$ and $y^{23}$. The levers $y^{21}$ will then engage the latter lugs and stop the disk at the position of rest.

One of the controller-disks is shown developed in the diagram Fig. 2, where the dotted line O O represents the position of rest and the dotted line O' O' the talking position of the strips on the disks relative to the brushes. The ringer cannot, however, send out a signal until one of a series of controller-magnets $Y^2$ become energized. These controller-magnets are each provided with a pivoted armature $y^{24}$, which normally engages a catch $y^{25}$ upon a lever $y^{26}$ and holds it normally from engagement with the contact-stop $y^{19}$. When, however, one of these magnets is energized, that one which is so energized will release its lever $y^{26}$, which under the tension of a spring $y^{27}$ will be sent into engagement with the contact $y^{19}$, and thus partially complete the ringer-circuit of the cord-circuit to which it corresponds, there being as many ringer-controller magnets as cord-circuits. The connection of the levers $y^{26}$ with contacts $y^{17}$ is broken at the end of a call by the lugs $y^{23}$ engaging the lower ends of said levers. (Shown most clearly in Fig. 11.) This operation at the same time resets the levers $y^{26}$ by sending their catches into engagement with the controller-magnet armatures. For this purpose the controller-magnets are arranged in a row above the controller-disks. The circuit of each ringer-controller magnet (see Fig. 2) includes a battery $X^3$, the busy-wheel P, a shuttle-retaining lever $m^2$, shuttle-carrier $M'$, a contact-point $y^{28}$, and the shuttle stop-lever $w^8$, which is brought into electrical connection with the point $y^{28}$ by means of an arm $w^{16}$ pivoted in the upper end thereof and provided with a contact-pin $w^{17}$ for engaging the contact $y^{28}$. I provide, therefore, as many contacts $y^{28}$ as controller-magnets and arrange them in an arc of a circle and at such intervals (see Fig. 23) that they will normally be beyond the sweep of the pin $w^{17}$, carried by the stop-lever; but when this lever impinges upon a stop $w^{10}$ its detent $w^9$, with which the arm $w^{16}$ is preferably integral, will be thrown back, which will send the pin $w^{17}$ into engagement with that one of the contacts $y^{28}$ which corresponds to the stop struck by the stop-lever, and therefore to the controller-magnet required, which completes the circuit of that magnet and operates upon the ringer-circuit, as described. This, however, is conditional. If the shuttle of the called subscriber happens to be dropped, then there will be a break in the circuit of the ringer-controller magnet, and hence the ringer will not work. It is this break in the circuit of the ringer-controller which occurs at the point of contact between the shuttle-retaining lever and shuttle-carrier that constitutes the busy test. It is on account of this busy-test circuit that the busy-wheel and shuttle-retaining levers are insulated from the rest of the switchboard, for each of said retaining-levers forms a portion of a separate electric circuit.

The calling subscriber's instructions are to wait for a signal before taking down his receiver. Failing to get the signal, he will at once know that the line he wants is busy.

The clearing-out device comprises mechanism for releasing the shuttle-locks and allowing them, together with the carriages, to return to their positions of rest. This clearing-out device comprises, among other parts, a series of clearing-out magnets Z, secured to suitable supports $z$, mounted upon a stationary plate $z'$, which rests upon the end plate I' of the frame of the switchboard. The clearing-out magnets are, in the case illustrated, ten in number, one for each set of bus-bars, and are grouped upon the top of the supporting-plate $z'$, as shown most clearly in the top plan view, Fig. 22. The armature of each clearing-out magnet is carried by a lever $z^2$, which in turn carries a depending detent $z^3$, which passes through an aperture $z^0$ in the plate $z'$, large enough to allow the said detent $z^3$ to oscillate. Each of said detents is oscillated constantly by a pin $z^4$, carried upon one of the rods $z^5$ of the reciprocating carriage. The rods $z^5$ of this carriage are connected at their ends to the end plates $z^6$, which slide upon rods $z^7$, secured just beneath the plate $z'$. (See Figs. 11, 22, and 32, the latter being a perspective detail view of the reciprocating carriage.) This carriage is connected by means of a connecting-rod $z^8$ to the upper end of a lever $z^9$, mounted upon a rocking shaft $z^{10}$ as a fulcrum. This shaft is rocked by means of two cam-levers $z^{11}$ and $z^{12}$, which engage the cams Q' and T², respectively. As long as the detents $z^3$ are oscillated in this manner and none of the stops $w^{10}$ are thrown up the detents will sweep clear of the rest of the mechanism and not perform any act. If, however, one of the stops $w^{10}$ is thrown up by the detent $w^9$, as described and shown most clearly in Fig. 26, a pin $z^{13}$, carried upon a pivoted dog $z^{14}$ in the upper end of the levers $w^{15}$, will be brought into the path of the detent, which will engage it, as shown, the said pin $z^{13}$ being sent into the path of the detent by the arm of the dog striking a stationary stop $z^{15}$ owing to the partial rotation of the lever $w^{15}$. After the engagement of the detent $z^3$ with the pin $z^{13}$ the said detent swings to the right, as shown in Fig. 27, which imparts a limited rotary motion to the shaft $w^{14}$. Each shaft $w^{14}$ carries an arm $w^{18}$, (see Figs. 11, 25, and 27,) having a slot in its lower end which engages a pin $w^{19}$ upon an arm $w^{20}$, carried by each of the fulcrum-rods $m^9$ of the shuttle-lock. When, therefore, this limited rotation is in the manner above described imparted to one of the shafts $w^{15}$, it will act through the lever-arms $w^{18}$ and $w^{20}$ and rotate the shuttle-lock and release the shuttle. The position of the system of levers when this unlocking takes place is shown in Fig. 27.

The foregoing clearing-out operation takes place only when the clearing-out magnets are not energized. The clearing-out magnet of the calling subscriber is, however, energized as soon as the ringer-controller commences to operate and remains so after the subscriber takes down his receiver, as will be shown. The clearing-out magnet thus energized attracts its armature and lifts its detent $z^3$ clear of the path of the pin $z^{13}$, so that the shuttles of the conversing pair will not be stopped or cleared out until the conversation ceases, when the clearing-out magnets become de-energized, as will be shown, and clear out the shuttles, as above described. Each clearing-out magnet is connected in and forms a part of the cord-circuit (see Fig. 2) and is first energized by a short circuit completed by the brush $y^{18}$ and contact-strips $y^{15}$ of the ringer-controller and later by the current which flows over the subscriber's circuit after he takes down his receiver and becomes practically de-energized by the reduction of current-flow in said circuit when the subscriber hangs up his receiver, due to the fact that the latter operation places in the subscriber's circuit his high-resistance ringer of, say, one thousand ohms. The supply of current of the clearing-out magnet is therefore directly dependent upon the ohmic resistance of the subscriber's circuit.

The operation of the system.

Assuming that all of the shuttles are in the position of rest and that subscriber No. 55 wants to call up subscriber No. 54, the operation of the system is as follows: The calling subscriber sets his sender so that the number "54" is displayed at the window. He will then turn the calling-knob and wait for his bell to ring before proceeding. The act of turning this calling-knob sets the parts of the sender in the locked position shown in Fig. 8, which first causes that leg of the subscriber's metallic circuit to ground, which at the exchange is in contact with the ground terminal-spring $k^4$. Reading the diagrams, Figs. 1 and 2, together it will be seen that a continuous path for the current has been established from the ground at the subscriber's station through the pin $e^7$, contact-spring $e^9$, and the contact device $e^{15}$ to the leg 1 of the subscriber's line, one of the carriage-rods, the carriage-terminal spring $k$, the ground terminal-spring $k^4$ and its tap to the pin No. 55 on the rotary contact-maker operated by the busy-wheel. As soon, then, as the brush $u^6$ of this rotary contact-maker reaches the pin No. 55 the circuit is completed through said pin and brush, the power device, starting-magnet S, the battery X, the contact device J, the ground at the exchange, and back to the subscriber's station. The current flowing thus energizes the said starting-magnet, stops the busy-wheel, and at the same time starts the power device, as fully described. This gives the rack Q at the central exchange a lateral movement, finger No. 55 of which rack impinges on finger No. 55 of the busy-wheel which happens to be in its path at the time said busy-wheel is stopped and causes the said finger to strike the shuttle-releasing lever corresponding thereto, which consequently drops the shuttle No. 55 and brings the line-spring terminals carried upon the carriage controlled by this shuttle into the selective position shown in dotted lines in Fig. 2. In this position the line-spring terminals are brought in contact with the power-bars L', at the same time breaking connection with the ground-spring terminal $k^4$. When the master-shaft has traveled a certain arc of a circle, the restoring wheel or cam restores the busy-wheel stop and the clutch-actuating lever to their initial positions, so that the busy-wheel is again started and the master-shaft again stopped. As the line-carriage 55 is now in the selective position—that is, in contact with the power-bars—current flows over line 2 of subscriber No. 55 through the magnet F of the sender and through springs $e^8$ $e^9$ to ground. The magnet then attracts its armature $f$, releases the locking mechanism of the sender by liberating the detent $d^{13}$ and the lever $e^{13}$, and allowing the locking system of the sender to return to its initial position, at the same time starting the rotary contact-maker D of the sender. The return of the locking and contact devices of the sender to their original positions breaks the original ground-circuit through the contact-springs $e^8$, $e^9$, and $e^{16}$ of the sender. The contact-maker D of the sender in its rotation now sends a series of impulses from the battery $X^2$, Fig. 2, over both legs of the metallic circuit and the coils of the selector-magnets V' V², causing these magnets to oscillate their armatures, which starts the selector, causing it to release its timing-train and rotate its brushes $v^2$ $v^3$. The act of the calling subscriber in setting his number-dials connects to the units-leg or leg 1 of his metallic circuit four of the ground contact-points $c$ and to the tens-leg or leg 2 of his metallic circuit five of the ground contact-points $c'$. Thus as the brushes $d^2$ $d^3$ sweep over the contacts of the rotary contact-maker D of the sender the magnet V² of the selector at the exchange will receive four impulses caused by the short-circuiting of the pins $d'$ by the brush $d^2$ of the sender, and the magnet V' of the selector will receive five impulses caused by the short-circuiting of the pins $d$ by the brush $d^3$. The selector-magnet V², therefore, receiving four impulses, will oscillate its pallet four times and send the brush $v^3$ into engagement with the fourth segment of the group $v'$, and the selector-magnet V', receiving five impulses, will oscillate its pallet five times and send the brush $v^2$ into engagement with the fifth segment of the group $v$. The brushes $v^2$ and $v^3$ will thus stop upon the fifth and fourth segments, respectively, after which, the timing-train of the selector having run down, the contact-maker $v^6$ will short-circuit the contacts $v^0$. This results in the establishment of a circuit through the restarting-magnet S' as soon as the brush $u^5$ arrives upon the contact-pin 54 of the rotating contact-maker U, current flowing into the circuit from the battery X', through the coils of the magnet S', segment $v^4$ of the selector, the fifth segment of the group $v$ of the selector, and brush $v^2$ thereof, into the segment $u^2$ of the rotating contact-maker U, brush $u^7$ thereof into the brush $u^5$ and through the contact-pin 54 into the segment No. 4 of the group $v'$ of the selector, through the brush $v^3$ thereof into the segment $v^5$, and thence through the time contact-maker $v^6$ back to the battery. The current flowing thus energizes the restarting-magnet, and this magnet, through the mechanical connection of its armature with that of the starting-magnet, as fully described, stops the busy-wheel and starts the master-shaft again. The rack Q is again oscillated and drops shuttle No. 54 into the selective position. On further movement of the master-shaft the shuttle-pinion-rotating mechanism is brought into play, and as the teeth of both shuttles have been dropped into engagement with said pinion these shuttles are rotated on their fulcra until the stop-lever $w^8$ strikes stop No. 1 of the series of stops $w^{10}$, as we assume that the exchange was idle when the call was sent in. The rotation of this shuttle-pinion, limited, as described, by the stop-lever, sends the spring-terminal carriages of both the called and calling subscribers into the talking position, in which their spring-terminals will be in contact each with a single pair of bars or cord-circuit terminals L. The shuttle-lifting cam next operates and sends the lifting-bar N' into engagement with the teeth of both shuttles and lifts the said shuttles into the locked position. The lifting-lever and lifting-bar and afterward the pinion-rotating lever return to the position of rest, and the restoring-cam, as before described, stops the master-shaft and starts the busy-wheel again. The mechanism of the exchange is now in the same condition as it was before the call went in, except that two of the terminal spring-carriages are in talking position No. 1 and that the limiting-stop No. 1 is thrown up out of the sweep of the stop-lever $w^8$, which is held in this position, as described, until the clearing-out device operates to drop the shuttles. The stop-lever $w^8$, impinging on stop No. 1, sends its contact-pin $w^{17}$ into engagement with the first of the series of contact-points $y^{28}$, and thus completes a circuit through the first of a series of ringer-controlling magnets $Y^2$, the said circuit including a battery $X^3$, the busy-wheel P, the shuttle-retaining lever $m^2$, the shuttle-carrier M', coils of the magnets $Y^2$, contacts $y^{28}$ and $w^{17}$, and stop-lever $w^8$. If, however, the shuttle-carrier M'—in this case the carrier of shuttle No. 54—had been dropped, or, in other words, was busy, this circuit through the ringer-controlling magnets $Y^2$ would have been broken, and consequently the calling subscriber would receive no signal, from which he will know that the line with which he wants to connect is busy, said break in the circuit of the controller-magnets constituting the busy test. If the called subscriber's line is not busy, the controller-magnets $Y^2$ will be energized and will release the armature $y^{26}$, which will engage the contact $y^{19}$, connected to the poles of the ringer Y. By this time the first of the series of controller-disks Y' will be released and start to rotate, as described, bringing its contact-strips into engagement with the brushes $y^{16}$ $y^{17}$ $y^{18}$, which connects the ringer in multiple with the subscriber's circuit, and thus sends to each subscriber a signal which lasts until the rotation of the said disk has broken the connection between the said strips and the brushes $y^{16}$ and $y^{17}$. For a portion of this time the clearing-out magnet Z, corresponding to the shuttle-lock into which the shuttles have been sent, is energized by a short circuit completed through the brush $y^{18}$ and strip $y^{15}$ of the controller-disk, which lasts for a time determined by the length of the strip $y^{15}$. The clearing-out magnet being thus energized, as fully described, lifts its detent $y^3$ clear of the sweep of the clearing-out levers which act to release the shuttles from the locked position, and hence the shuttles remain locked through the short-circuiting of the clearing-out magnets until the subscriber is given time to take down his receiver. The taking down of the receiver has greatly lessened the resistance of the subscriber's circuit, as it has shunted the high-resistance ringer of, say, one thousand ohms (see Fig. 1) and provided a path having only the resistance of the transmitter and receiver of, say, seventy-five ohms. By thus reducing the resistance of the circuit a sufficient amount of current flows therethrough to energize the clearing-out magnet after the short circuit therethrough has been broken, and therefore the connection between the subscribers thus made by bringing their respective terminal spring-carriages into engagement with the same pair of cord-circuit terminals remains established as long as the conversation lasts. The subscribers having finished the conversation will hang up their receivers and this will again connect into the circuit the high-resistance polarized ringer, which will again increase the resistance of the circuit and reduce the flow of current through the clearing-out magnet to such an extent that its armature will drop and release the shuttle-locks and allow the shuttles to return to their positions of rest, as herein fully described.

I will now show what occurs when other calls come into the exchange while conversation is still going on between the subscribers, say Nos. 54 and 55. Supposing subscriber No. 65 wants to call up subscriber No. 2, he will operate the sender, as described above, which results in the dropping of shuttle No. 65, the operation of his selector to establish a local circuit through the pin No. 2 of the rotating contact-maker U, and eventually in the dropping of shuttle No. 2. The pin-oscillator now moves this pair of shuttles into the talking position. Its lever passes stop No. 1, which is thrown up by the subscribers 54 55, and the lifting-lever then raises the shuttles into engagement with shuttle-lock No. 2, thereby connecting the pair of subscribers in talking position No. 2, or, in other words, with the second pair of cord-circuit terminals. The rest of the operation is identical with that described relative to subscribers 54 and 55. A third pair of subscribers being switched would occupy the third talking position and a fourth pair the fourth position, and so on until the ten talking positions, or, in other words, the ten pairs of cord-circuit terminals, have been occupied. In this case all of the stops $w^{10}$ would be out of the way and permitting the stop-lever to travel its full stroke. If, therefore, an eleventh pair of shuttles should have been dropped, they would be carried past the last shuttle-lock and would after being lifted immediately return to rest, the absence of a ringer-signal notifying the subscriber that his connection has not been successful. This last condition cannot in practice arise, but is merely a created or supposed condition.

It will be obvious that additional shuttles and shuttle-locks might be provided without in any way departing from the spirit of my invention.

I have described above what takes place when a call is sent in for a subscriber whose line is already busy. The calling subscriber thus finding the line which he wants busy leaves his dial set for the number wanted and repeats the call at any time by simply turning the calling-knob, when the same series of operations will be gone through with, as described—that is to say, the calling-subscriber's shuttle will be dropped, but no signal will be received on account of the break in the busy-test circuit. He may repeat this operation as often as desired, knowing that if he does not receive a signal in about eleven seconds the line wanted is busy. Just as soon, however, as the called subscriber's line becomes idle the calling subscriber will receive a signal.

A very essential feature of the construction I employ is the alternate operation of the busy-wheel and the switching apparatus proper. I make it possible to, as it were, store up calls at the subscribers' senders and dispose of them at the exchange one after the other, not in the rotation in which they may have been made, but in the numerical relation which they bear to each other, and as the period of rotation of the busy-wheel is only a few seconds no objectionable arrangement is thereby created and absolute freedom of the system from interference is provided.

I am well aware that it has been attempted in the art to provide for this same object, but the enormous complication of the apparatus necessary to eliminate interference has so far rendered the use of such devices prohibitive from a practical standpoint.

A single motive-power device will take care of the entire set of shuttles, or an extra or reserved-power device may be provided with suitable cut-off and switch mechanism, whereby the operation of the exchange may be instantly thrown from one power device to the other. Such a construction will admit of the inspection and, if necessary, the repair of one power-machine at a time without interrupting the service.

In the case of an exchange operating day and night it is of the greatest importance to be able to inspect and repair that portion of the mechanism which is subject to the usual wear and tear without being compelled to discontinue the service. As the construction of this reserve-power device is identical with the one described, it need not here be shown.

In order to facilitate the explaining of the system, I have shown and described above an exchange having a limited number of subscribers; but it is obvious that with the same means a combination of stations of any number can be constructed capable of handling a larger number of subscribers than could be satisfactorily embodied in a self-contained section, as described.

Having thus described a form of my invention, it is obvious that the same is capable of many modifications which may be made without departing from the spirit thereof; but

What I claim, and desire to secure by Letters Patent of the United States, is—

1. In a telephone-exchange, the combination with a plurality of subscribers' lines leading into said exchange, of a plurality of cord-circuits, and automatic means for connecting said subscribers' lines and cord-circuits.

2. In a telephone-exchange, the combination with a plurality of subscribers' lines leading into said exchange, of a plurality of cord-circuits, and identical means, automatically operated, for connecting both the calling and called subscribers with said cord-circuits.

3. In a telephone-exchange, the combination with a series of subscribers' lines leading into said exchange, of a series of cord-circuits having terminals, and a series of automatically-operated terminal-switches—one for each line—said switches making connection between one or more of said lines and cord-circuit terminals.

4. In a telephone-exchange, the combination with a series of independent lines leading into said exchange, of one or more loop-circuits, and automatically-operated means for uniting any two of said lines with each other through one of said loop-circuits.

5. In a telephone-exchange, the combination with a series of subscribers' lines leading into said exchange, of a series of conducting-bars, a series of loop-circuits each uniting a single pair of said bars, and automatic means for forming a temporary electrical connection between any of said lines and a pair of said bars.

6. In a telephone-exchange, the combination with a series of subscribers' lines leading into said exchange, of a series of conducting-bars, a series of loop-circuits each uniting a single pair of said bars, and a series of automatically-operated terminal-switches—one for each line—forming temporary electrical connection between any of said lines and a pair of said bars.

7. In an automatic telephone-exchange, the combination with subscribers' movable line-terminal switches, of means common to all of said switches for shifting the same, a power device for operating said shifting means, and an electromagnet for initially controlling said power device.

8. In an automatic telephone-exchange, subscribers' lines leading into said exchange, a series of conducting-rods—a pair of said rods for each line—a movable switch mounted upon each pair of said rods, line-terminal springs carried by each of said switches, a series of conducting-bars disposed crosswise of said rods, and means for shifting said switches to bring two of the same into contact with a single pair of said bars at a time.

9. In an automatic telephone-exchange, the combination with a number of subscribers' lines leading into said exchange, of switching apparatus located at said exchange, and electromagnetic means for initially controlling the said switching apparatus, and means for rendering the said initial controlling means operative by the subscribers non-simultaneously, and in a fixed order of rotation.

10. In an automatic telephone-exchange, the combination with a series of subscribers' lines leading into said exchange, of switching apparatus, electromagnetic means for initially controlling the operation of said switching apparatus, and means for forming temporary electrical connection between said initial controlling means and one of said lines at a time.

11. In a telephone-exchange, the combination with a series of subscribers' lines leading into said exchange, of automatically-operated switching apparatus, a single electromagnet for initially controlling the operation of said switching apparatus, and means for forming a temporary electrical connection between said magnet and one of said lines at a time.

12. In an automatic telephone-exchange, the combination with a series of subscribers' lines leading into said exchange, of switching apparatus located at said exchange, electromagnetic means for initially controlling the operation of said switching apparatus, and a progressive contact-maker placing the said controlling means in operative connection with said lines successively and with one at a time.

13. In an automatic telephone-exchange, the combination with a series of subscribers' lines leading into said exchange, of switching apparatus located at said exchange, an electromagnet for initially controlling the said switching apparatus, and a progressive contact device placing said controlling-magnet in connection with said lines successively and with one at a time.

14. In a telephone-exchange, the combination with automatic switching mechanism, of a series of subscribers' lines leading into said exchange, a series of ringer-circuits of less number than said lines, and a busy test controlling each of said ringer-circuits.

15. In a telephone-exchange, the combination with automatic switching mechanism, of a series of subscribers' lines leading into said exchange, a series of ringer-circuits less in number than said lines, an auxiliary controlling-circuit for each ringer-circuit, the said ringer-circuits being dependent upon the electrical condition of said auxiliary circuits.

16. In an automatic telephone-exchange, the combination with a series of subscribers' lines leading into said exchange, of a series of ringer-circuits of less number than said lines, an auxiliary controlling-circuit for each ringer-circuit, and a busy test included in said auxiliary circuit.

17. In a telephone-exchange, the combination with automatically-operated switching mechanism, of a series of subscribers' lines leading into said exchange, a series of ringer-circuits of less number than said lines, a ringer-controller and a series of ringer-controller magnets, a series of auxiliary controlling-circuits each including one of said magnets, and a busy test in each of said auxiliary circuits.

18. In a telephone-exchange, the combination with automatically-operated switching mechanism, of a series of subscribers' lines leading into said exchange, a series of ringer-circuits of less number than said subscribers' lines, a series of auxiliary controlling-circuits one for each of said ringer-circuits, and means comprising the busy test for breaking the electrical continuity of said circuits when the lines corresponding to said circuits are in use.

19. In an automatic telephone-exchange, the combination with a series of subscribers' lines leading into said exchange, of a series of ringer-circuits of less number than said subscribers' lines, a ringer-controller located in each of said ringer-circuits, a controller-magnet for each of said ringer-controllers, a series of auxiliary controlling-circuits one for each ringer-circuit and each of said auxiliary circuits including the coils of one of said controller-magnets, means for establishing any of said auxiliary circuits, and means comprising the busy test for breaking the electrical continuity of any of said auxiliary circuits when the line corresponding to that circuit is in use.

20. In a telephone-exchange having automatically-operated line-terminal switches and cord-circuits provided with terminals, devices whereby the said cord-circuit terminals when engaged by the said terminal-switches, are made inaccessible to the remaining switches in rotation, and are made accessible again by the subscriber upon the termination of his conversation.

21. In a telephone-exchange having automatically-operated line-terminal switches and cord-circuits, power-bars accessible to all idle terminal-switches, and inaccessible to busy terminal-switches.

22. A telephone system having a central exchange and subscribers' stations, automatically-operated switching mechanism located at said exchange, a circuit normally broken at the subscriber's station and at the central exchange, a progressive contact-maker closing the break in said circuit at the central exchange at periodically-recurring intervals, and means at the subscriber's station for closing the break at the subscriber's station, said switching mechanism being made operative upon the establishment of said circuit.

23. In an automatic telephone system, the combination with subscribers' stations and an exchange, of lines leading from said subscribers' stations to said exchange, a common return between the said subscribers' stations and said exchange, the said common return being normally disconnected from the subscribers' lines both at the subscribers' stations and at the said exchange, a progressive contact-maker connecting the said common return to the subscribers' lines one at a time periodically and in rotation, means at the subscribers' stations for connecting the said subscriber's line to the common return, and automatic switching mechanism at the said exchange, the said mechanism being rendered operative upon the establishment of any one of the circuits including the said common return.

24. In an automatic telephone system, the combination with subscribers' telephone instruments and an exchange, of a signaling device initially under the control of the subscriber, means embodied in the said signaling device whereby said device becomes independent of the subscriber immediately upon the initiation of its operation, and means both at the exchange and at the signaling device whereby the operation of said signaling device is made dependent upon the operation of apparatus at the said exchange.

25. In a telephone system having subscribers' stations and an automatic exchange, the combination with a subscriber's station and a metallic circuit having a single pair of terminal contacts at the said exchange, of a normally open ground at the subscriber's station, and an intermittently-closed ground through one of the said terminal contacts at the exchange.

26. In an automatic telephone system, the combination with the following instrumentalities, viz., a sender, a detent for the said sender actuated from a central exchange, a selector at the said exchange operated by the said sender, and connecting or circuit-establishing devices at the said exchange adapted to operate in pairs, the selection of the elements of the said pairs being dependent upon said sender.

27. In an automatic telephone-exchange having line-terminal switches and cord-circuits, a selector, two or more independent circuits controlling the said selector, a series of local circuits any one of which is established by the coöperation of the first-named circuits, the number of circuits established being equal to the number of terminal-switches.

28. In an automatic telephone-exchange having line-terminal switches and bus-bars, a system of levers for shifting said switches, power-driven means for operating said levers, and a locking device for locking the levers of the calling and called subscribers beyond the control of the power mechanism.

29. In an automatic telephone-exchange having line-terminal switches and bus-bars, a system of levers for shifting said switches, power-driven means for operating said levers, a locking device for locking the levers of the calling and called subscribers beyond the control of the power mechanism, and a clearing-out device for restoring said terminal-switches and levers after the termination of the conversation.

30. In an automatic telephone-switchboard, the means for establishing the subscribers' connections in a fixed order of rotation, comprising the following elements, viz: a normally-rotating shaft, a series of radial fingers disposed spirally around said shaft, means under the control of the calling subscriber for bringing said fingers to rest, and means independent of the subscriber for restarting said fingers.

31. An automatic telephone-switchboard comprising the following elements, viz: a series of subscribers' terminal-switches—one for each line—and a series of bus-bars, a system of levers operating to shift the terminal-switches into engagement with the bus-bars, a normally-rotating shaft, a series of radial fingers disposed spirally around said shaft, means under the control of the calling subscriber for stopping the rotation of the said shaft and fingers, means independent of either subscriber for restarting said shaft and fingers, and means operating in conjunction with said fingers for releasing the said levers and shifting said switches, said means being dependent upon the successive order in which said fingers arrive upon a given line.

In testimony whereof I affix my signature in presence of two witnesses.

ERNEST A. FALLER.

Witnesses:
JAMES W. CHISHOLM,
JOHN H. HOLT.